US008947588B2

(12) United States Patent
Shirakawa

(10) Patent No.: US 8,947,588 B2
(45) Date of Patent: Feb. 3, 2015

(54) IMAGE PROCESSING DEVICE, IMAGE PROCESSING METHOD, IMAGE PROCESSING PROGRAM

(71) Applicant: JVC Kenwood Corporation, Yokohama-shi, Kanagawa (JP)

(72) Inventor: Ryuji Shirakawa, Fuchu (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 101 days.

(21) Appl. No.: 13/749,184

(22) Filed: Jan. 24, 2013

(65) Prior Publication Data
US 2013/0208144 A1 Aug. 15, 2013

(30) Foreign Application Priority Data

Feb. 14, 2012 (JP) ................. 2012-029318
Feb. 14, 2012 (JP) ................. 2012-029323
Oct. 17, 2012 (JP) ................. 2012-229507
Oct. 17, 2012 (JP) ................. 2012-229508

(51) Int. Cl.
| | | |
|---|---|---|
| *H04N 5/222* | (2006.01) | |
| *H04N 9/68* | (2006.01) | |
| *H04N 5/235* | (2006.01) | |
| *H04N 5/353* | (2011.01) | |
| *H04N 5/217* | (2011.01) | |

(52) U.S. Cl.
CPC ........... *H04N 5/2354* (2013.01); *H04N 5/3532* (2013.01); *H04N 5/217* (2013.01)

USPC .......................................... 348/371; 348/234

(58) Field of Classification Search
USPC .............. 348/370–376; 396/61–62, 106–110
See application file for complete search history.

(56) References Cited

U.S. PATENT DOCUMENTS

| | | | |
|---|---|---|---|
| 2012/0026359 A1* | 2/2012 | Fukushima et al. ....... | 348/226.1 |
| 2012/0188403 A1* | 7/2012 | Gomita ...................... | 348/226.1 |

FOREIGN PATENT DOCUMENTS

| | | |
|---|---|---|
| JP | 2010-213220 A | 9/2010 |
| JP | 2011-015222 A | 1/2011 |
| JP | 2011-101208 A | 5/2011 |

* cited by examiner

*Primary Examiner* — Mekonnen Dagnew
(74) *Attorney, Agent, or Firm* — Nath, Goldberg & Meyer; Jerald L. Meyer; Katelyn J. Bernier

(57) ABSTRACT

A flash detection unit calculates a line average luminance of each line of the current screen of image data and a screen average luminance of a past screen at least one screen before the current screen and compares the calculated line average luminance with the calculated screen average luminance to detect whether the current screen includes a line of high luminance due to a flash. A holding unit holds the past screen of the image data. A flash correction unit, if it is detected that some lines of the current screen have high luminance, replaces the lines having high luminance in the current screen with corresponding lines of the past screen held in the holding unit to correct the image data.

18 Claims, 19 Drawing Sheets

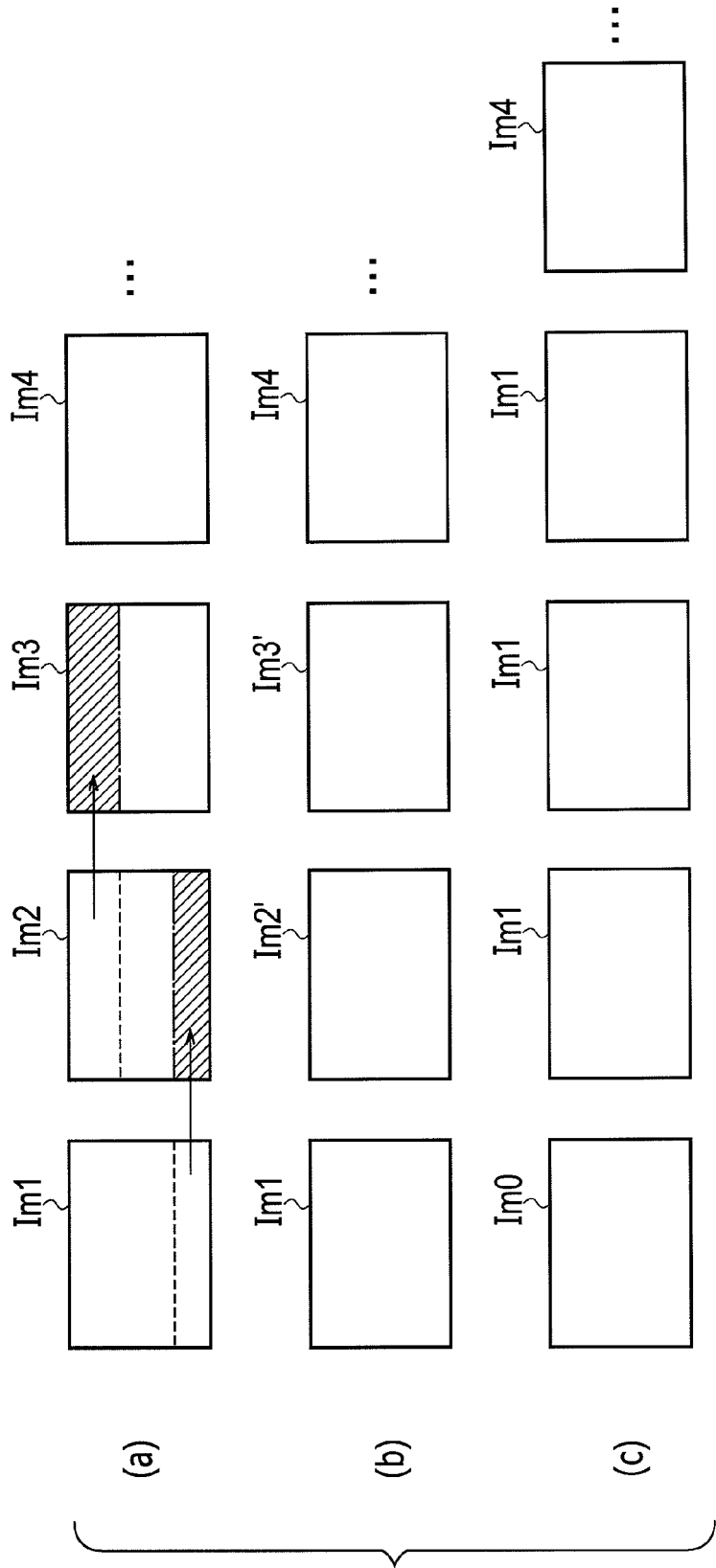

IMAGE PROCESSING DEVICE, IMAGE PROCESSING METHOD, IMAGE PROCESSING PROGRAM

CROSS REFERENCE TO RELATED APPLICATION

This application is based upon and claims the benefit of priority under 35 U.S.C. §119 from Japanese Patent Applications No. P2012-029318, filed on Feb. 14, 2012, No. P2012-029323, filed on Feb. 14, 2012, No. 2012-229507, filed on Oct. 17, 2012, and No. 2012-229508, filed on Oct. 17, 2012, the entire contents of all of which are incorporated herein by reference.

BACKGROUND

Embodiments relate to an image processing device, an image processing method, and an image processing program which are capable of correcting a screen of moving image that includes discontinuous image brightness due to unexpected flash from devices other than the device which is taking the moving image.

In recent years, imaging devices, such as video cameras, often employ CMOS (complementary metal oxide semiconductor) sensors. Reading of imaging signals by the CMOS sensors is performed by the rolling shutter method performing reset, exposure, and reading of the pixels not all at one time but sequentially line-by-line. In this method, the reading timing is sequentially shifted in the line direction.

At a wedding ceremony or the like, for example, many video cameras and still cameras take images of a same subject at the same time. In such a case, strong light for a short time by flash lamps of others is sometimes incident on the CMOS sensors during exposure of only a part of lines in a screen. Accordingly, the amount of exposure is partially different in the screen, thus producing a bright area like a white band in the screen to form a discontinuous image. That problem is caused not only by light from flash lamps but also in the case where strong light for a short period, like flash, is incident on CMOS sensors.

There are propositions of various types of solutions for this problem as described in Japanese Patent Laid-open Publications Nos. 2010-213220, 2011-15222, and 2011-101208, for example.

SUMMARY

It is therefore demanded to detect and correct, with fewest false positives that strong light for a short emission period, such as flash, is incident on the CMOS sensors to cause discontinuity in image brightness in the screen. However, it is not preferable that the memory resource is increased to detect the discontinuity of image brightness in a screen. Accordingly, it is further demanded to detect the discontinuity of image brightness without increasing the memory resource. Still furthermore, it is demanded to minimize the delay due to the correction processing to detect and correct the discontinuity of image brightness.

An object of the embodiments is to provide an image processing device, an image processing method, and an image processing program which are capable of accurately detecting the discontinuity of image brightness in a screen.

Another object of the embodiments is to provide an image processing device, an image processing method, and an image processing program which are capable of detecting the discontinuity of image brightness in a screen without increasing the memory source.

Still another object of the embodiments is to provide an image processing device, an image processing method, and an image processing program which are capable of correcting the discontinuity of image brightness in a screen with less delay due to the correction process.

To solve the aforementioned conventional technical problem, a first aspect of the embodiments provides an image processing device, comprising: a flash detection unit configured to calculate a line average luminance of each line of the current screen of image data and a screen average luminance of a past screen at least one screen before the current screen and compares the calculated line average luminance of each line with the calculated screen average luminance to detect whether some lines of the current screen have high luminance due to a flash; a holding unit configured to hold the past screen of the image data; and a flash correction unit configured to, if it is detected by the flash detection unit that some lines of the current screen have high luminance, replace the lines having high luminance in the current screen with corresponding lines of the past screen which are held in the holding unit to correct the image data.

A second aspect of the embodiments provides an image processing method, comprising: calculating a line average luminance of each line of a current screen of image data;

calculating a screen average luminance of a past screen of the image data, the past screen being at least one screen before the current screen; comparing the line average luminance of each line and the screen average luminance to detect whether some lines of the screen have high luminance due to a flash by; holding the past screen of the image data in a holding unit; and if it is detected that some lines of the current screen have high luminance, replacing the lines of high luminance in the current screen with lines of the past screen held by the holding unit to correct the image data.

A third aspect of the embodiments provides an image processing program causing a computer to implement the following functions, comprising: a function of calculating a line average luminance of each line of a current screen of image data; a function of calculating a screen average luminance of a past screen of the image data, the past screen being at least one screen before the current screen; a function of comparing the line average luminance of each line and the screen average luminance to detect whether some lines of the screen have high luminance due to a flash by; a function of holding the past screen of the image data in a holding unit; and a function of, if it is detected that some lines of the current screen have high luminance, replacing the lines of high luminance in the current screen with lines of the past screen held by the holding unit to correct the image data.

BRIEF DESCRIPTION OF THE DRAWINGS

FIG. 6 is a view for explaining correction of image data in the first embodiment.

DETAILED DESCRIPTION

Hereinafter, a description is given of embodiments of an image processing device, an image processing method, and an image processing program with reference to the accompanying drawings. In each embodiment, as an example, the image processing device is applied to a video camera, and the description is given of the image processing method performed by the video camera and the image processing program causing a computer mounted on the video camera to execute image processing.

First Embodiment

Figure 1:
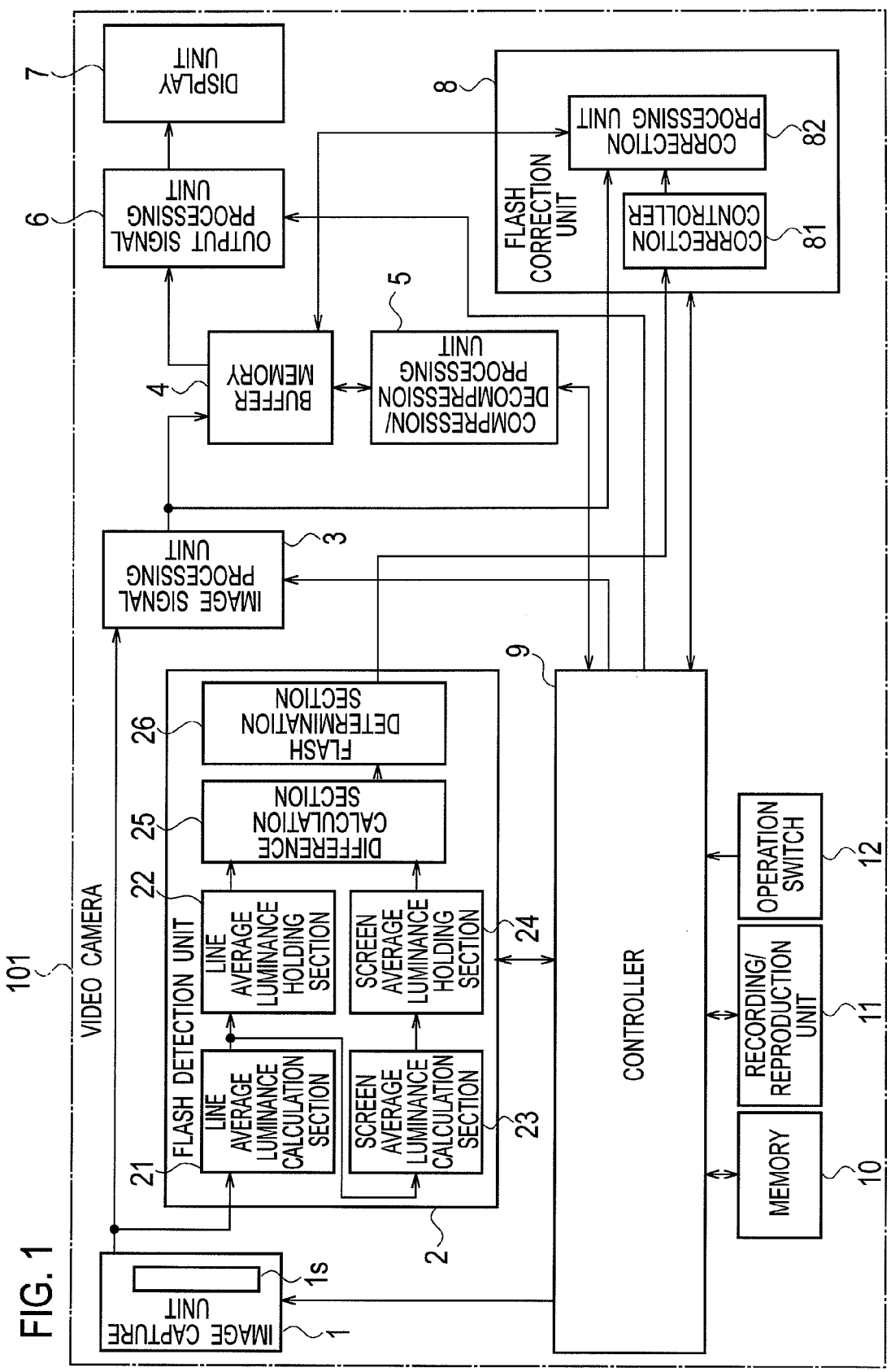
FIG. 1 is a block diagram illustrating an image processing device of a first embodiment.

A description is given of the entire configuration of a video camera 101 as an image processing device of a first embodiment using FIG. 1. The video camera 101 includes an image capture unit 1, a flash detection unit 2, an image signal processing unit 3, a buffer memory 4, a compression/decompression processing unit 5, an output signal processing unit 6, a display unit 7, a flash correction unit 8, a controller 9, a memory 10, a recording/reproduction unit 11, and an operation switch 12.

The image capture unit 1 includes an optical system (not shown) including a lens, a diaphragm, and the like, CMOS sensors 1s, a control mechanism (not shown) for exposure, and the like. As an example, the image capture unit 1 includes three CMOS sensors 1s and outputs electric signals representing R, G, and B signals as red, green, and blue color signals from the three CMOS sensors 1s. Certainly, the number of CMOS sensors may be one. The image capture unit 1 extracts optical information inputted through a lens into the CMOS sensors 1s as electric signals and supplies the electric signals to the flash detection unit 2 and image signal processing unit 3.

The flash detection unit 2 includes a line average luminance calculation section 21, a line average luminance holding section 22, a screen average luminance calculation section 23, a screen average luminance holding section 24, a difference calculation section 25, and a flash determination section 26. The flash detection unit 2 detects a flash under the control by the controller in the following manner.

The line average luminance calculation section 21 calculates the average brightness of each line based on the electric signal supplied from the image capture unit 1. In the first embodiment, the electric signal used in the calculation is the G signal among the R, G, and B signals. Specifically, the line average luminance calculation section 21 adds up the value of G signal over the effective pixels in a line and divides the obtained sum by the number of effective pixels of the line to calculate the average brightness of the line (line average luminance). The signal used to calculate the line average luminance is not limited to the G signal.

The line average luminance calculated by the line average luminance calculation section 21 is inputted to the line average luminance holding section 22 and the screen average luminance calculation section 23. The line average luminance holding section 22 temporarily stores the line average luminance calculated by the line average luminance calculation section 21. The screen average luminance calculation section 23 calculates the average brightness over the whole screen (one frame).

Specifically, the screen average luminance calculation section 23 adds up the sequentially inputted line average luminances over the effective lines of one screen and divides the obtained sum by the number of effective lines of the screen to calculate the average brightness over the whole screen (screen average luminance). The screen average luminance holding section 24 temporarily holds the screen average luminance.

The difference calculation section 25 receives the line average luminances held by the line average luminance holding section 22 and the screen average luminance held by the screen average luminance holding section 24. The screen which is subjected to the calculation of screen average luminance and the screen which is subjected to the calculation of line average luminances are shifted from each other by one screen. The screen which is subjected to the calculation of screen average luminance corresponds to a screen just before the screen which is subjected to the calculation of line average luminances.

The screen average luminance of the previous screen may be held for a period of one screen to be used as the screen average luminance of the screen two screens before the current screen. Moreover, it is possible to hold both the screen average luminance of the previous screen and the screen average luminance of the screen two screens before the current one and use the screen average luminance of the screen two screens before the current one when the previous screen is influenced by a flash.

In the first embodiment, the line average luminances are calculated for the current screen, and the screen average luminance is calculated for the previous screen. The difference calculation unit 25 sequentially calculates the difference between each line average luminance of the current screen and the screen average luminance of the previous screen. The difference calculation section 25 outputs the absolute value of the calculated difference as the difference value.

The difference value calculated by the difference calculation section 25 is inputted to the flash determination section 26. The flash determination section 26 determines whether the difference value of each line is less than a threshold value and furthermore determines whether the number of consecutive lines that have difference values of not less than a threshold value is less than a previously set number of lines.

If it is not determined that the number of consecutive lines that have difference values of not less than a threshold value is less than a previously set number of lines, the flash determination section 26 detects that discontinuous image brightness is caused by a flash. The flash determination section 26 outputs a detection signal indicating that there is a flash and simultaneously outputs data indicating the number of the first line of the consecutive lines that have difference values of not less than the threshold value, which corresponds to the start time of the flash, and data indicating the number of the first line that has a difference value of less than the threshold value after the consecutive lines. The line just before the first line that has a difference value of less than the threshold value is the last line of the flash.

If it is determined that there is a flash, the flash determination section 26 generates 1 as the detection signal indicating that there is a flash and generates 0 as the detection signal indicating that there is no flash.

As apparent from the above description, the flash detection unit 2 detects a flash only by calculating the line average luminance, screen average luminance, and difference value and judging the calculated difference value. Accordingly, the flash detection unit 2 does not need to include a large-capacity memory resource such as a frame memory. In the above description, the flash detection unit 2 detects light form a flash lamp. However, the flash detection unit 2 also detects discontinuous image brightness when strong light for a short time like the light from a flash lamp is incident on the CMOS sensors 1s. The detection of a flash herein includes such a case.

The flash detection unit 2 compares the line average luminance of each line of the current screen with the screen average luminance of a past screen, for example, the previous screen, for example. Accordingly, if some lines of the screen have high luminance due to a flash, the difference values of all the lines having high luminance are not less than the threshold value. If the line average luminances of adjacent lines are compared in the current screen, only the boundary line between the normal lines and high luminance lines has a difference value of not less than the threshold value.

In the first embodiment, it is therefore possible to detect discontinuity of image brightness in a screen with fewer false positives.

The image signal processing unit 3 converts the electric signals supplied from the image capture unit 1 to signals of a predetermined signal system. In the first embodiment, as described above, the electric signals are R, G, and B signals. The image signal processing unit 3 therefore adjusts the white balance and gain and performs gamma processing and the like, followed by conversion to a luminance signal Y and color-difference signals Cb and Cr. The flash detection unit 2 may calculate the line average luminance and screen average luminance based on the luminance signal Y.

The buffer memory (holding unit) 4 temporarily holds image data including the luminance signal Y and color-difference signals Cb and Cr outputted from the image signal processing unit 3. The memory and operation resources required for the image processing can be reduced if the color-difference signals Cb and Cr are band-limited and are subjected to time-division multiplexing.

If a flash is detected, the image data inputted from the image signal processing unit 3 and held in the buffer memory 4 is used in an image data correction process by the flash correction unit 8 described later.

The compression/decompression processing unit 5 reads image data from the buffer memory 4 for compression processing thereof by a compression method such as MPEG-2, MPEG-4, AVC/H.264, JPEG, or the like to generate encoded data. Moreover, the compression/decompression processing unit 5 reads and reproduces encoded data recorded in the recording reproduction unit 11 and performs decompression processing for the encoded data.

The output signal processing unit 6 outputs the image data read from the buffer memory 4 to an external device (not shown). Simultaneously, the output signal processing unit 6 converts the same to an NTSC signal, for example, depending on the input format of the display unit 7 and changes the size of the image data depending on the display screen of the display unit 7, so that image data can be displayed on the display unit 7. The image data is then supplied to the display unit 7 and is displayed. The output signal processing unit 6 also receives on-screen signal outputted from the controller 9 and superimposes the on-screen signal on the image data.

The flash correction unit 8 receives the detection signal outputted from the flash determination section 26. The flash correction unit 8 includes a correction controller 81 and a correction processing section 82. The flash correction unit 8 corrects image data having discontinuous image brightness due to a flash under the control by the controller 9.

When the flash detection unit 2 detects a flash, the correction controller 81 receives the detection signal indicating that there is a flash ("1"), the data indicating the number of the first line of the flash, and the data indicating the number of the first line after the flash. Instead of the data indicating the number of the first line after the flash, data indicating the number of the last line of the flash may be inputted.

When the flash detection unit 2 does not detect a flash, the detection signal indicating that there is no flash ("0") is inputted to the correction controller 81.

In the controller 9, any one of a low-delay mode and a screen-based mode (described later) is set. The flash detection unit 2 and flash correction unit 8 refer to the mode set in the controller 9. The correction controller 81 controls the correction processing section 82 so that the correction processing section 82 executes the operation of correction processing corresponding to the mode set in the controller 9. The screen-based mode is not essential, and the low-delay mode or the screen-based mode may be selected as needed.

First, a description is given of the operation of the correction processing section 82 when the flash detection unit 2 does not detect a flash. At the low-delay mode, the correction processing section 82 supplies the image data which is outputted from the image signal processing unit 3 and inputted to the correction processing section 82 directly to the buffer memory 4. The image data read from the buffer memory 4 is supplied to the compression/decompression processing unit 5 and output signal processing unit 6 and is subjected to the above-described processes of the compression/decompression processing unit 5 and output signal processing unit 6.

At the screen-based mode, the correction processing section 82 receives the image data of the previous screen, which is inputted from the image signal processing unit 3 to the buffer memory 4 and is read out, and supplies the inputted image data of the previous screen directly to the buffer memory 4. Similarly, the image data read from the buffer memory 4 is supplied to the compression/decompression processing unit 5 and output signal processing unit 6 and is subjected to the above-described processes of the compression/decompression processing unit 5 and output signal processing unit 6.

Next, a description is given of the operation of the correction processing unit 82 when the flash detection unit 2 detects a flash. At the low-delay mode, the correction processing section 82 reads the image data of the previous screen inputted from the image signal processing unit 3 to the buffer memory 4. The correction processing section 82 corrects image data by replacing plural lines having discontinuous brightness due to the flash in the image data, which is outputted from the image signal processing unit 3 and inputted to the correction processing section 82, with plural lines corresponding thereto in the image data of the previous screen, which is read from the buffer memory 4.

The image data corrected by the correction processing section 82 is similarly supplied to the compression/decompression processing unit 5 and output signal processing unit 6 through the buffer memory 4.

The image data outputted from the image signal processing unit 3 may be delayed by a time corresponding to two screens through the buffer memory 4, and plural lines having discontinuous brightness due to a flash in the image data inputted to the correction processing section 82 is replaced with plural lines corresponding thereto in the image data of the screen two screens before the current one.

In the screen-based mode, the correction processing section 82 corrects image data by replacing a screen including plural lines having discontinuous brightness due to a flash in the image data of the previous screen with the image data of the past screen. The image data corrected by the correction processing section 82 is similarly supplied to the compression/decompression processing unit 5 and output signal processing unit 6 through the buffer memory 4.

In the case of providing the screen-based mode, the buffer memory 4 needs to hold the image data of at least two screens which is outputted from the image signal processing unit 3. Depending on the flash timing, three past screens are necessary. In the first embodiment, the buffer memory 4 holds image data of three screens. In the case of providing only the low-delay mode, the buffer memory 4 only needs to hold image data of at least one screen.

The controller 9 can be composed of a microcomputer including a CPU. The controller 9 includes a storage storing a control program controlling the entire video camera 101 and controls the entire video camera 101 based on the control program. In order to implement the image processing of the first embodiment with an image processing program, the image processing program executing the image processing of the first embodiment may be provided as a part of the control program. In this case, the controller 9 executes the image processing program to perform flash detection and correct imaging data when detecting a flash.

The controller 9 is connected to the memory 10 as a work memory of the controller 9. The controller 9 is further connected to the recording/reproduction unit 11 and the operation switch 12.

Upon being instructed by the operation switch 12 to record a taken moving image, the controller 9 makes control so that the encoded data outputted from the compression/decompression processing unit 5 is recorded in the recording/reproduction unit 11. Upon being instructed by the operation switch 12 to record a taken moving image, the controller 9 causes the recording/reproduction unit 11 to reproduce and read the encoded data and to supply the same to the compression/decompression processing unit 5. The controller 9 generates an on-screen signal by following the operation of the operation switch 12 and supplies the same to the output signal processing unit 6.

The flash detection unit 2 is composed of hardware in the example shown in FIG. 1 but may be composed of software. Specifically, the configuration equivalent to the flash detection unit 2 may be implemented by executing a flash detection program as a part of the image processing program of the first embodiment. The flash correction unit 8 may be also composed of software. Specifically, the configuration equivalent to the flash correction unit 2 may be implemented by executing a flash correction program as a part of the image processing program of the first embodiment.

Herein, a description is given of a phenomenon of discontinuous image brightness in a moving image which is caused by an unexpected flash of a person other than the person who is taking the moving image.

The CMOS sensors is employing the rolling shutter method read pixel data of the captured image line Ln by line Ln. As shown in (b) of FIG. 2, in each of images ST1, ST2, ST3, ST4, . . . of a subject by the image capture unit 1, the first to the last lines Ln of each screen are temporally shifted. The imaging time of each line Ln includes exposure time and read time of pixel data as shown in (a) of FIG. 2.

Figure 2:
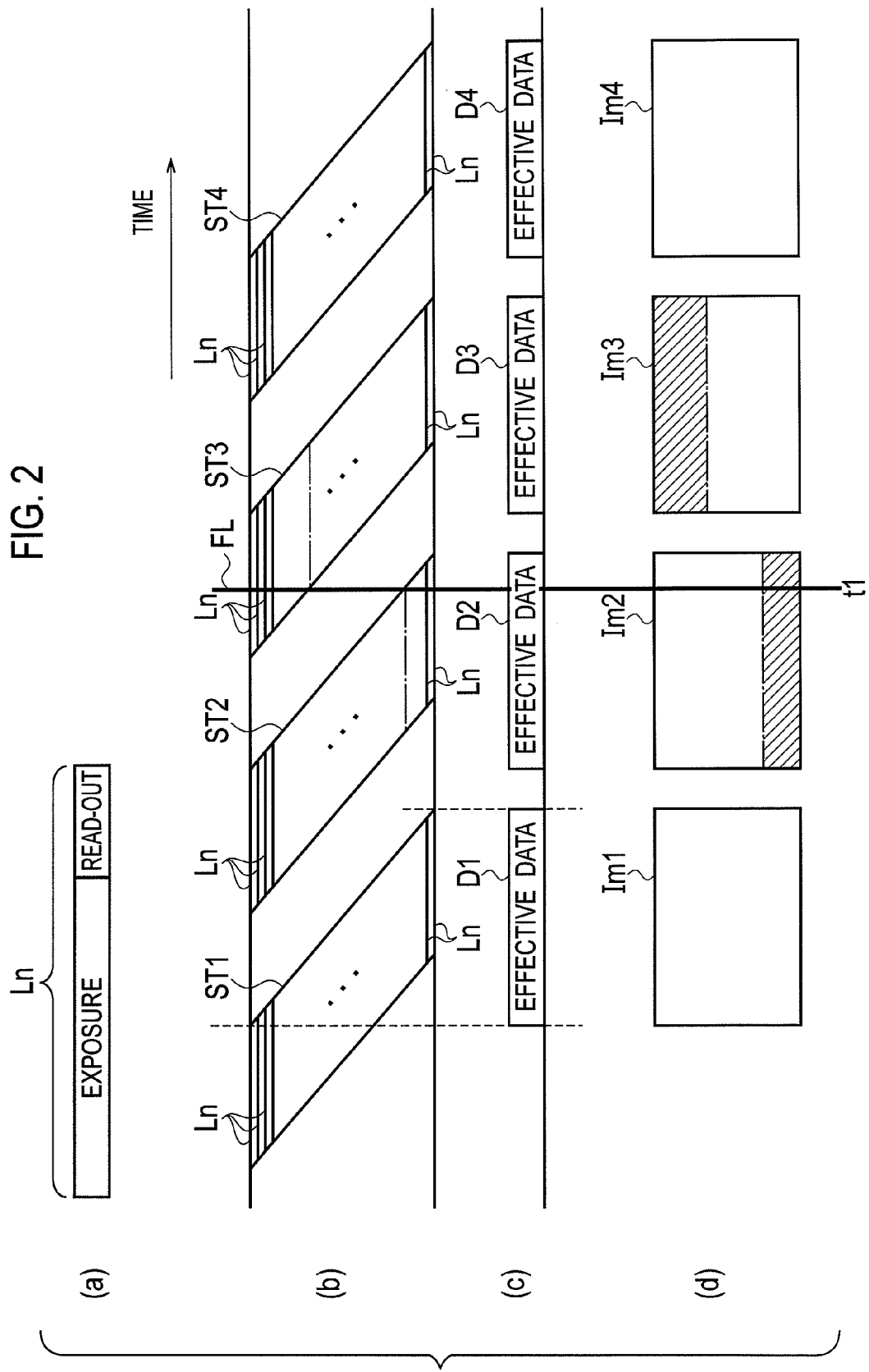
FIG. 2 is a view for explaining a phenomenon of discontinuity in image luminance that is caused by a flash in the process of taking a moving image with CMOS sensors.

As shown in (c) of FIG. 2, based on the images ST1, ST2, ST3, ST4, . . . captured by the image capture unit 1, effective data sets D1, D2, D2, D4, . . . are outputted from the image capture unit 1. It is assumed that a flash FL by a person other than the person who is taking the moving image occurs at time t1 and is incident on the CMOS sensors 1s. In this case, the flash FL influences the lines Ln from the position indicated by the dashed-dotted line to the last line Ln in the image ST2 and the lines Ln from the first line Ln to the position indicated by the dashed-dotted line in the image ST3.

If the image data correction of the first embodiment is not performed, images Im1, Im2, Im3, Im4 . . . displayed on the display unit 7 (images recorded in the recording/reproduction unit 11) are as shown in (d) of FIG. 2.

The images Im1 and Im4 are normal images which are not influenced by the flash FL and have continuous image brightness. The image Im2 is an abnormal image which includes a bright white band in the lower half below the dashed-dotted line and has discontinuous image brightness. The hatched area indicates a high-luminance portion. The image Im3 is an abnormal image which includes a similar bright white band in the upper half above the dashed-dotted line and has discontinuous image brightness.

In the case of using a flash of the video camera 101 which is taking the moving image, the flash timing is matched to the image capture timing as shown in (b) of FIG. 2. Accordingly, the above-described phenomenon of discontinuous image brightness does not occur as shown in (d) of FIG. 2.

Figure 3:
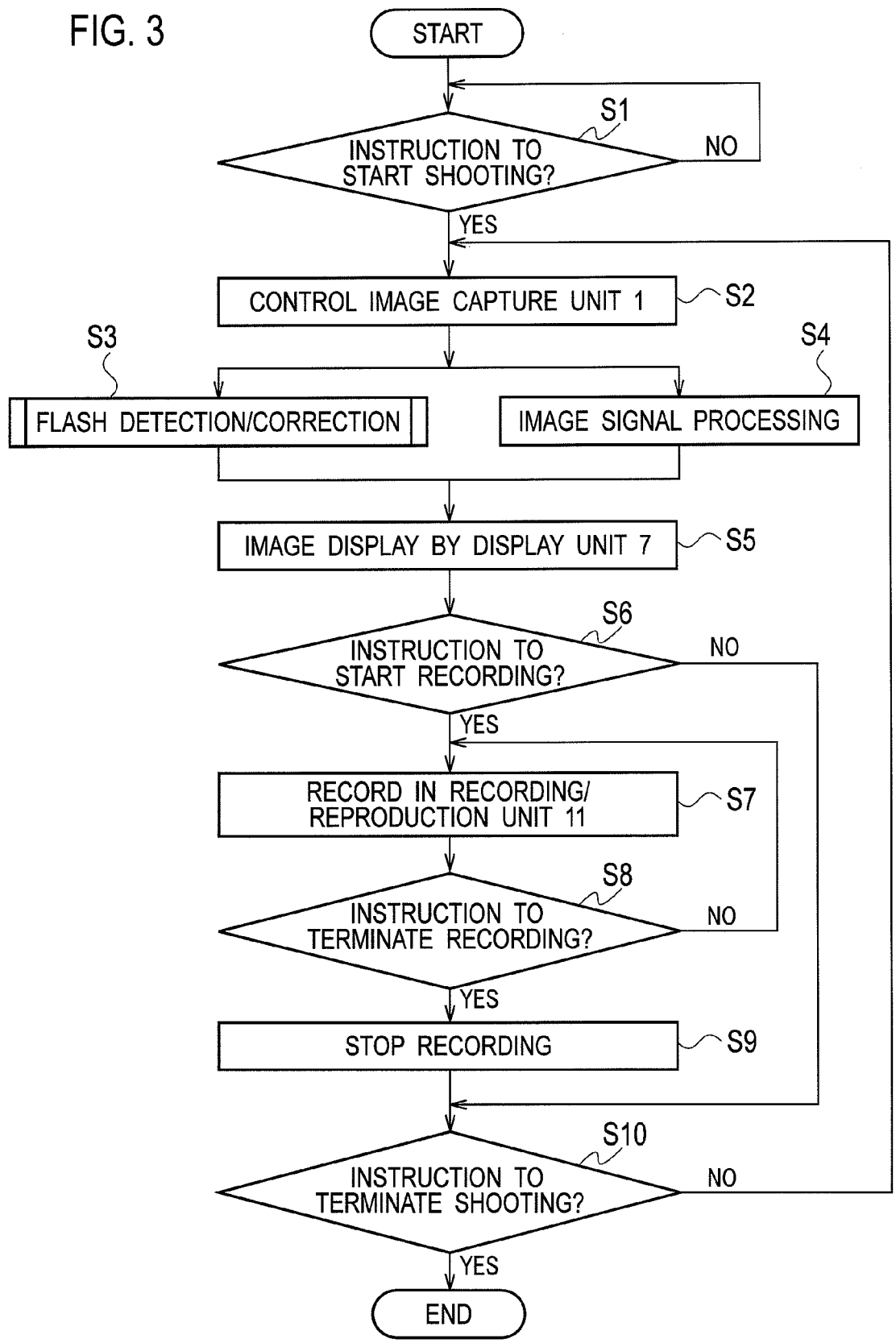
FIG. 3 is a flowchart showing an entire sequence of image taking and recording processes in the image processing device of the first embodiment.

The operation of the video camera 1 according to the first embodiment is described in more detail with reference to FIGS. 3 and 4. FIG. 3 shows the entire sequence of image taking and recording process by the video camera 101.

In FIG. 3, the controller 9 determines in step S1 whether there is an instruction by the operation switch 12 to start shooting. If it is determined that there is an instruction to start shooting (YES), the controller 9 controls and causes the image capture unit 1 to start image capture in accordance with the conditions including the diaphragm and shatter speed. The instruction to start shooting may be an instruction by the operation switch 12 to turn on the video camera 101. If it is not determined that there is an instruction to start image capture (NO), the controller 9 returns the process to the step S1 and repeats the step S1.

In step S3, the controller 9 causes the flash detection unit 2 to execute the flash detection process and causes the flash correction unit 8 to execute the flash correction process. The controller 9 causes the image signal processing unit 3 to execute the image signal processing in step S4 in parallel to the step S3. The flash detection and correction processes of the step S3 are described in detail later. In step S5, the controller 9 controls and causes the output signal processing unit 6 to display the captured image on the display unit 7.

In step S6, the controller 9 determines whether there is an instruction by the operation switch 12 to start recording. If it is determined that there is an instruction to start recording (YES), the controller 9 causes the recording/reproduction unit 11 to record the encoded data outputted from the compression/decompression processing unit 5 in step S7. If it is not determined that there is an instruction to start recording (NO), the controller 9 moves the process to step S10.

In step S8, the controller 9 determines whether there is an instruction to terminate recording. If it is determined that there is an instruction to terminate recording (YES), in step S9, the controller 9 stops recording in the recording/reproduction unit 11. If it is not determined that there is an instruction to terminate recording (NO), the controller 9 returns the process to the step S7 and repeats the step S7.

In step S10, the controller 9 determines whether there is an instruction by the operation switch 12 to terminate shooting. If it is determined that there is an instruction to terminate shooting (YES), the controller 9 terminates the process. If it is not determined that there is an instruction to terminate shooting (NO), the controller 9 returns the process to step S2 and repeats step S2 and subsequent steps. The instruction to terminate image capture may be an instruction by the operation switch 12 to turn off the video camera 101.

The flash detection and correction processes of the step S3 shown in FIG. 3 is described in detail with reference to FIGS. 4A and 4B. The following steps are executed by the flash detection unit 2 and flash correction unit 8 based on the control by the controller 9. The step S3 in the first embodiment is referred to as step S3$_1$.

Figure 4A:
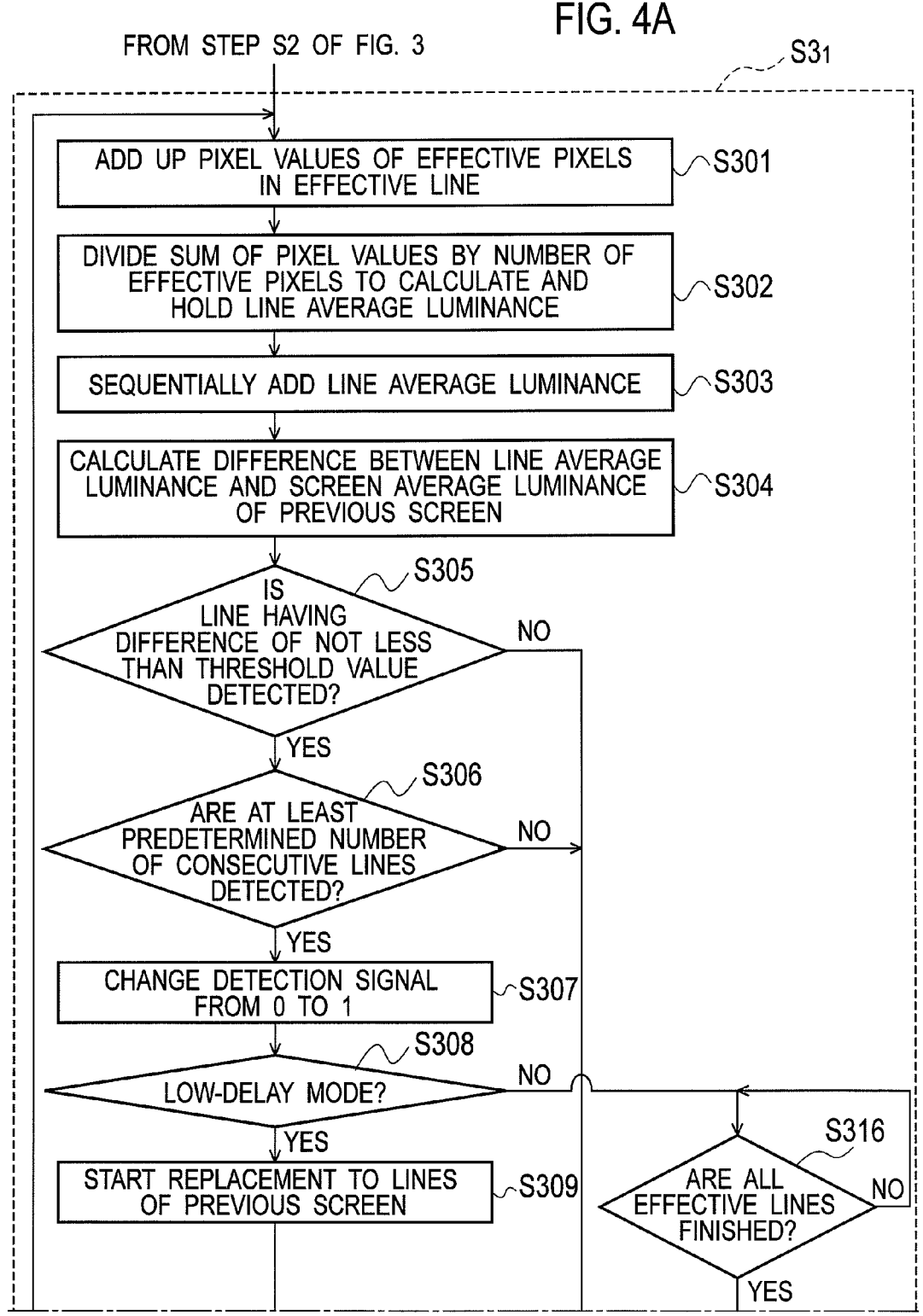
FIGS. 4A and 4B are a flowchart showing details of a flash detection and correction processes in the first embodiment.

In FIG. 4A, in step S301, the flash detection unit 2 sequentially executes, effective line by effective line, a process of adding up pixel values of effective pixels of each effective line. The effective lines refer to lines during a period except the vertical blanking intervals. The effective pixels are pixels during a period except the horizontal blanking intervals. In step S302, the flash detection unit 2 divides the sum of the pixel values obtained in the step S301 by the number of effective pixels to calculate the line average luminance and holds the calculated line average luminance.

In step S303, the flash detection unit 2 executes a process of sequentially adding up the line average luminances. In step S304, the flash detection unit 2 executes a process of calculating a difference value between each line average luminance calculated in the step S302 and the screen average luminance of the previous screen. The difference calculation process in the step S304 is executed each time that the line average luminance is calculated in step S302.

In step S305, the flash detection unit 2 determines whether a line having a difference value of not less than the threshold value is detected. The threshold value in this process preferably needs to be changed depending on the situation of the subject but only needs to be set to an optimal value determined by experiments. For the purpose of detecting a large change in brightness due to an unexpected flash caused by others, the threshold value is preferably larger enough than the dynamic range of the inputted G signal. The smaller the threshold value is, the higher the sensitivity for flash detection can be.

If it is determined that a line having a difference value of not less than the threshold value is detected (YES), the flash detection unit 2 moves the process to the step S306. At this time, the flash detection unit 2 stores detected line information indicating how many lines are included between the detected line and the first line of the frame. If some consecutive lines have difference values of not less than the threshold value, the detected line information may include only the information about the first line of the consecutive lines.

On the other hand, if it is not determined that a line having a difference value of not less than the threshold value is detected (NO), the flash detection unit 2 deletes the already stored detected line information and moves the process to step S314. If there is no line that has a difference value of not less than the threshold value, it is determined that there is no flash.

In step S306, the flash detection unit 2 determines whether at least a predetermine number of consecutive lines have difference values of not less than the threshold value. If it is not determined that the predetermine number of consecutive lines have difference values of not less than the threshold value (NO), the flash detection unit 2 moves the process to step S307. If it is determined that a predetermine number of consecutive lines have difference values of not less than the threshold value (YES), the flash detection unit 2 moves the process to step S314.

Providing step S306 can prevent false positives even if the threshold value in step S305 is small. The predetermined number used in step S306 may be set to an optimal value determined by experiments. Even if some lines have difference values of not less than the threshold value, it is determined that there is no flash when at least the predetermined number of consecutive lines have difference values of not less than the predetermined value.

If it is determined in the step S306 that at least the predetermined number of consecutive lines have difference values of not less than the predetermined value, it is determined that there is a flash. The flash detection unit 2 then changes a detection signal "0", which indicates that there is no flash, to a detection signal "1", which indicates that there is a flash. The flash detection unit 2 supplies the detection signal of 1 and the stored detected line information to the flash correction unit 8 and then deletes the detected line information.

In step S308, the flash detection unit 2 and flash correction unit 8 determines whether the set mode is the low-delay mode. If it is determined that the set mode is the low-delay mode (YES), the flash correction unit 8 moves the process to step S309. If it is not determined that the set mode is the low-delay mode (NO), the flash correction unit 8 moves the process to step S316.

In step S309, the flash correction unit 8 starts replacement with lines of the previous screen which are indicated by the supplied detected line information. In FIG. 4B, in step S310, the flash detection unit 2 determines whether a line that has a difference value of less than the threshold value is detected. If it is determined that a line that has a difference value of less than the threshold value is detected (YES), the flash detection unit 2 moves the process to step S311. In this process, the flash detection unit 2 stores the detected line information indicating how many lines are included between the first line of the frame and the detected line. If some consecutive lines have difference values of not less than the threshold value, the detected line information may include only the information about the first line of the consecutive lines.

On the other hand, if it is not determined that a line that has a difference value of less than the threshold value is detected (NO), the flash detection unit 2 deletes the stored detected line information and moves the process to step S314.

In step S311, the flash detection unit 2 determines whether at least the predetermined number of consecutive lines have difference values of less than the threshold value. If it is not determined that at least the predetermined number of consecutive lines have difference values of less than the threshold value (NO), the flash detection unit 2 moves the process to step S312. If it is determined that at least the predetermined number of consecutive lines have difference values of less than the threshold value (YES), the flash detection unit 2 moves the process to step S314.

Providing step S311 can prevent false positives even if the threshold value of step S310 is small. The threshold value of step S310 is equal to that of step S305. The predetermined number used in step S311 may be set to an optimal value determined by experiments. The predetermined number used in step S311 may be equal to that used in step S306. Even if a line that has a difference value of less than the threshold value is detected, it is determined that the flash is not yet finished when at least predetermined number of consecutive lines have difference values of less than the threshold value.

In step 312, the flash detection unit 2 changes a detection signal "1" to a detection signal "0" and supplies the detection signal "0" and the stored detected line information to the flash correction unit 8. The flash detection unit 2 then deletes the detected line information. In step S313, the flash correction unit 8 terminates the replacement with lines of the previous screen, which are indicated by the supplied detected line information. The flash detection unit 2 then moves the process to step S314.

In step S314, the flash detection unit 2 determines whether the determination is finished for all of the effective lines. If it is determined that the determination is finished for all of the effective lines (YES), the flash detection unit 2 moves the process to step S315. If it is not determined that the determination is finished for all of the effective lines (NO), the flash detection unit 2 returns the process to step S301 and repeats step S301 and subsequent steps.

In step S305, the flash detection unit 2 divides the sum of the line average luminances by the number of effective lines to calculate the screen average luminance. The flash detection unit 2 holds the calculated screen average luminance and moves the process to step S5 of FIG. 3.

On the other hand, if it is not determined in step S308 that the set mode is the low-delay mode (it is determined that the set mode is the screen-based mode), the flash detection unit 2 determines in step S316 whether the determination for all of the effective lines is finished. If it is not determined that the determination for all of the effective lines is finished (NO), the flash detection unit 2 repeats the process of step S316.

If it is determined that the determination for all of the effective lines is finished (YES), the flash detection unit 2 divides the sum of the line average luminances by the number of effective lines to calculate the screen average luminance and holds the same.

In step S318, the flash correction unit 8 determines whether the process proceeds to the next screen. The information on whether the process proceeds to the next screen may be supplied to the flash correction unit 8 from the flash detection unit 2 or controller 9. If it is not determined that the process proceeds to the next screen (NO), the flash correction unit 8 repeats the process of step S318. If it is determined that the process proceeds to the next screen (YES), the flash correction unit 8 replaces the current screen in which a flash is detected with a past normal screen and then moves the process to step S5 of FIG. 3.

Figure 4B:
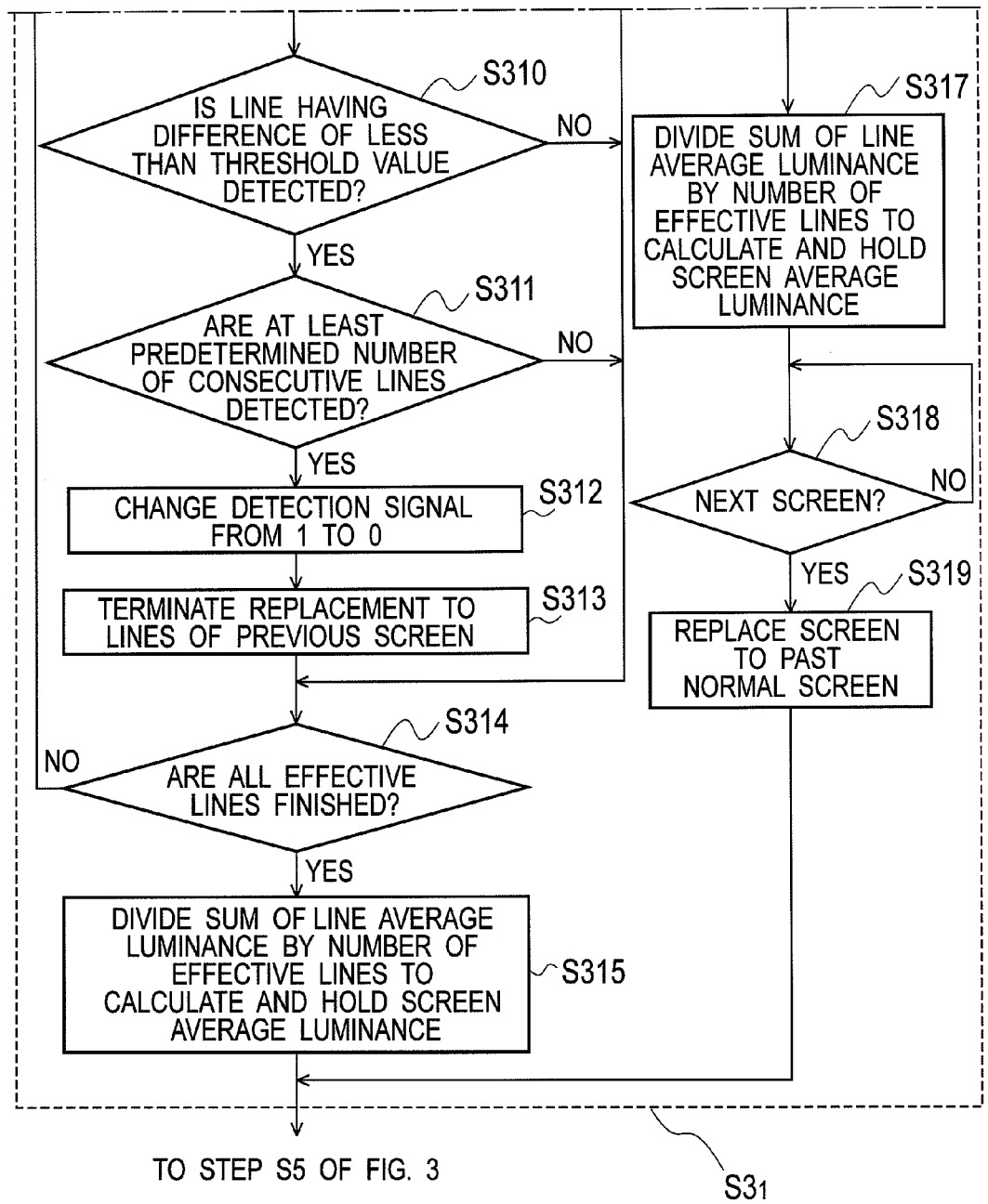

In the flowchart shown in FIGS. 4A and 4B, the threshold value used in step S305 is equal to that used in step S310. However, the threshold value used in step S305 may be different from that used in step S310.

In the case where the threshold value used in step S305 is different from that used in step S310, the flash detection unit 2 operates as follows. Based on the lines in which the difference values between the line average luminance and the screen average luminance are not less than a first threshold value, the flash detection unit 2 determines the start line of plural lines of high luminance due to a flash. In FIGS. 4A and 4B, the start line is decided when at least the predetermined number of consecutive lines have difference values of not less than the first threshold value.

Based on the lines that have line difference values of less than a second threshold value, which is smaller than the first threshold, the flash detection unit 2 determines the end line of the plural lines of high luminance due to the flash. The line just before the first line that has a difference value of less than the second threshold value is decided as the end line. In FIGS. 4A and 4B, the end line is decided when it is determined in step S311 that at least the predetermined number of consecutive lines have difference values of less than the second threshold value.

Figure 5A:
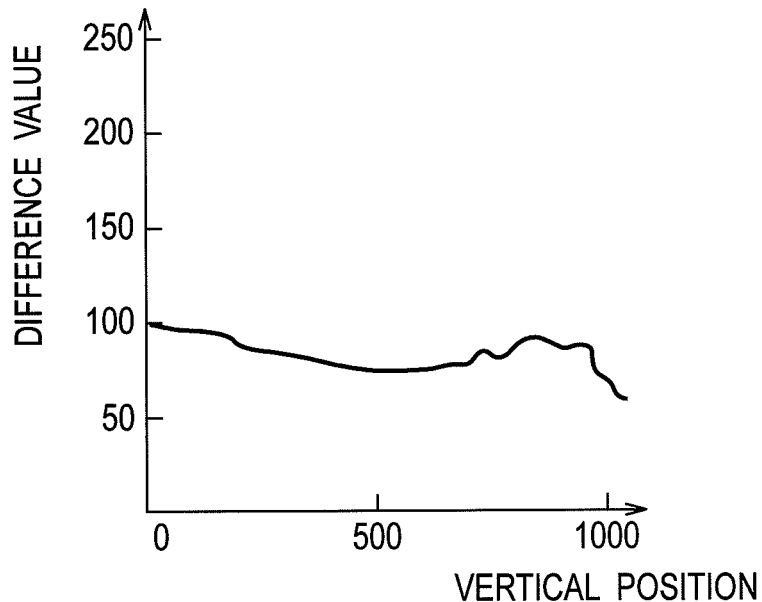
FIG. 5A is a diagram for explaining preferable examples of threshold values used in steps S305 and S310 in FIGS. 4A and 4B, showing an example of the relationship between the vertical position in the screen and difference value when there is no flash.
Figure 5B:
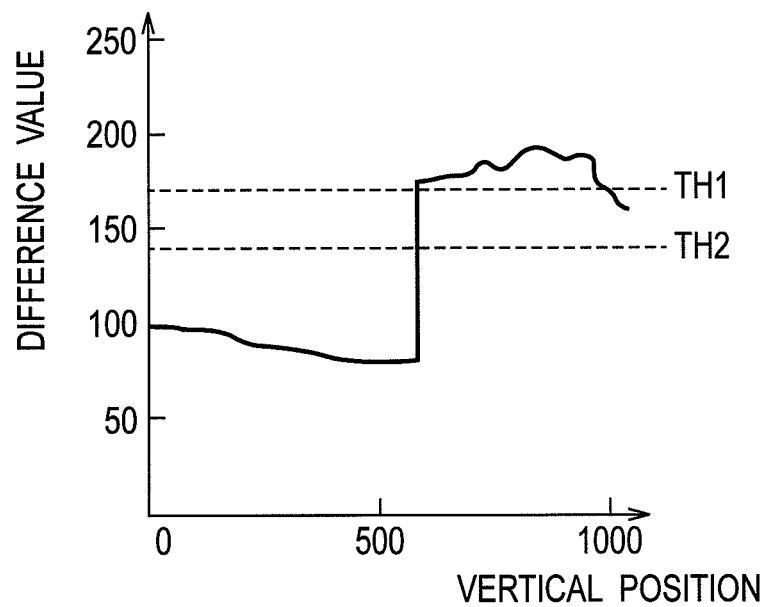
FIG. 5B is a diagram for explaining preferable examples of the threshold values used in the steps S305 and S310 in FIGS. 4A and 4B, showing an example of the relationship between the vertical position in the screen and the difference value when there is a flash.

FIG. 5A shows an example of the relationship between the vertical position in the screen and the difference value. The vertical position of the upper end of the screen is 0 on the horizontal axis. It is assumed that the image data has characteristics shown in FIG. 5A when there is no flash. In the characteristics shown in FIG. 5A, the difference value decreases near the lower end of the screen. If there is a flash at the center of the screen in the vertical direction, the difference value drastically increases.

In the case where the threshold values used in the steps S305 and 310 are a value TH1, it is detected that the influence of the flash finishes above the lower end of the screen although the difference value is influenced by the flash even at the lower end of the screen. It is therefore preferable that the threshold value used in step S305 is set to the threshold value TH1 and the threshold value used in step S310 is set to a threshold value TH2, which is smaller than the threshold value TH1. By setting the threshold value used in step S310 to the threshold value TH2, it can be correctly detected that the screen is influenced by the flash to the lower end.

A description is given of correction of image data according to the first embodiment with reference to FIG. 6. (a) of FIG. 6 shows images Im1, Im2, Im3, Im4 . . . before correction, which are shown in (d) of FIG. 2. In the case where the low-delay mode is set in the controller 9, the flash correction unit 8 corrects image data in the following manner.

In the image Im2 shown in (a) of FIG. 6, the flash detection unit 2 detects plural lines of high luminance from middle part of the screen below the dashed-dotted line of the image Im2 at steps S305 and S306 of FIG. 4A. The image Im2 has high luminance to the line at the lower end of the screen. In the process of step S309 and subsequence steps of FIGS. 4A and 4B, plural lines of high luminance in a hatched part of the image Im2 are replaced with corresponding plural lines of the image Im1 as shown in (a) of FIG. 6.

In the image Im3 shown in (a) of FIG. 6, the flash detection unit 2 detects plural lines of high luminance beginning from the upper end of the screen in the image Im2 at steps S305 and S306 of FIG. 4A. The flash detection unit 2 detects plural lines of normal luminance below the dashed-dotted line of the image Im3 at steps S305 and S306 of FIG. 4A. In the process of step S309 and subsequent steps of FIGS. 4A and 4B, the plural lines of high luminance in a hatched part of the image Im3 are replaced with corresponding plural lines of the image Im2 as shown in (a) of FIG. 6.

As a result, the flash correction unit 8 corrects the images Im2 and Im3 to images Im2' and Im3' as shown in (b) of FIG. 6, respectively. Accordingly, the image data supplied from the flash correction unit 8 to the buffer memory 4 includes the images Im1, Im2', Im3', Im4 . . . shown in (b) of FIG. 6. Herein, the image Im3 is corrected to the image Im3' using the image Im2 but may be corrected using the image Im1. In this case, the buffer memory 4 needs to hold image data two screens before the current screen.

At the low-delay mode, the delay of the image data corresponds to a time of plural lines due to the signal processing at the image signal processing unit 3 and is substantially very little. In the case of manually taking a moving image with the video camera 101, for example, adjustment of various settings of the video camera 101 is performed with the image displayed on the display unit 7 being checked. If the image data includes a large delay, the image cannot be checked at real time, thus making it difficult to perform proper operations in some cases. At the low-delay mode according to the first embodiment, the delay is very little, and the image can be checked at real time, thus enabling proper operations.

On the other hand, in the case where the screen-based mode is set in the controller 9, the flash correction unit 8 corrects image data in the following manner. As described above, in the screen-based mode, the flash correction unit 8 reads image data of the previous screen from the buffer memory 4 and supplies the same through the buffer memory 4 to the compression/decompression processing unit 5 and output signal processing unit 6 irrespective of the need for correction of the image data. Accordingly, as shown in (c) of FIG. 6, at the times when the images Im1 and Im2 shown in (a) of FIG. 6 before correction are intended to be outputted, the images Im0 and Im1, which are respectively just before the Im1 and Im2, are outputted.

At step S319 of FIG. 4B, the flash correction unit 8 outputs the image Im1 instead of the image Im2 having high luminance part and outputs the image Im1 instead of the image Im3 having high luminance part. Accordingly, the image data supplied from the flash correction unit 8 to the buffer memory 4 includes the images Im0, Im1, Im1, Im1, Im4 . . . shown in (b) of FIG. 6. In this case, two consecutive images include high luminance parts, and the buffer memory 4 therefore needs to hold image data three screens before the current screen.

Second Embodiment

Figure 7:
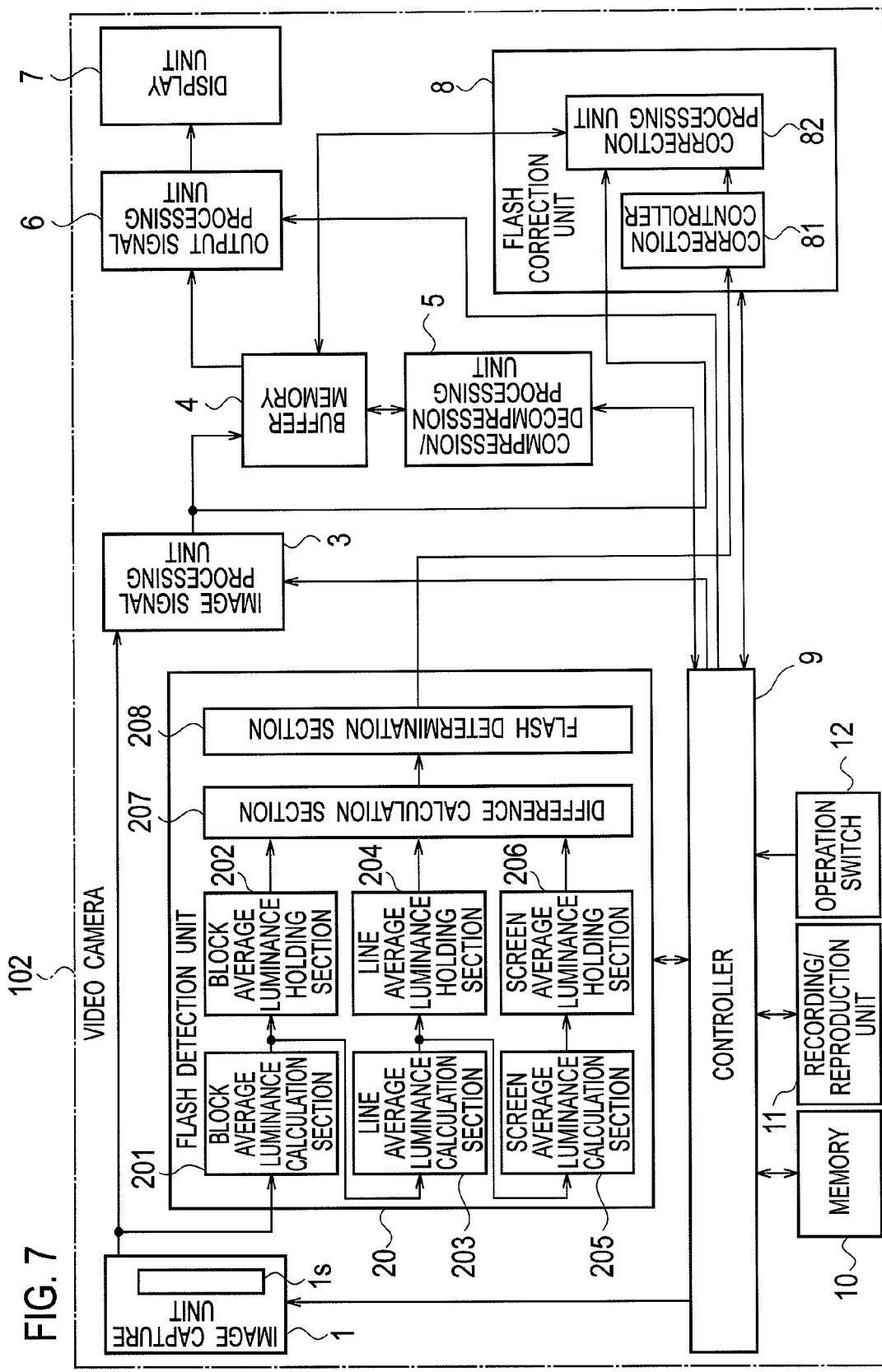
FIG. 7 is a block diagram showing an image processing device of a second embodiment.

In a second embodiment shown in FIG. 7, the same portions as those of FIG. 1 are given the same reference numerals, and the description thereof is properly omitted. A video camera 102 as an image processing device of the second embodiment includes a flash detection unit 20 instead of the flash detection unit 2. The flash detection unit 20 includes a block average luminance calculation section 201, a block average luminance holding section 202, a line average luminance calculation section 203, a line average luminance holding section 204, a screen average luminance calculation section 205, a screen average luminance holding section 206, a difference calculation section 207, and a flash determination section 208.

The flash detection unit 20 detects a flash in the following manner under the control by the controller 9. The block average luminance calculation section 201 divides the effective pixels of each line in the electric signal supplied from the image capture unit 1 into plural blocks and calculates an average brightness of each block. Preferably, the number of blocks is a power of 2.

Specifically, the block average luminance calculation section 201 adds up the values of G signal of the effective pixels in each block and divides the same by the number of effective pixels of the block to calculate the average brightness of the block (block average luminance).

The block average luminances calculated by the block average luminance calculation unit 201 are inputted to the average luminance holding section 202 and line average luminance calculation section 203. The line average luminance calculation section 203 adds up the block average luminances of each line and divides the same by the number of blocks of the line to calculate the average brightness of the line (line average luminance).

The line average luminances calculated by the line average luminance calculation unit 203 are inputted to the line average luminance holding section 204 and screen average luminance calculation section 205. The line average luminance holding section 204 temporarily holds the line average luminances calculated by the line average luminance calculation section 203.

The screen average luminance calculation section 205 adds up the sequentially inputted line average luminances of the effective lines in each screen and divides the same by the number of effective lines of the screen to calculate the average brightness of the entire screen (screen average luminance). The screen average luminance holding section 206 temporarily holds the calculated screen average luminance.

The difference calculation section 207 receives the block average luminances held by the block average luminance holding section 202, the line average luminances held by the line average luminance holding section 204, and the screen average luminance held by the screen average luminance holding section 206. The difference calculation section 207 sequentially calculates the difference between each block average luminance and the screen average luminance (referred to as a block difference value) and the difference between each line average luminance and the screen average luminance (referred to as a line difference value). The difference calculation section 207 calculates absolute values of the differences and outputs the same as difference values.

The difference values calculated by the difference calculation section 207 are inputted to the flash determination section 208. The flash determination section 208 determines whether the difference value between each line average luminance and the screen average luminance is less than a set threshold value (a threshold value 1).

If the difference value between each line average luminance and the screen average luminance is not less than the threshold value, the flash determination section 208 then determines whether the difference value between each block average luminance and the screen average luminance is less than a threshold value (a threshold value 2). The threshold values 1 and 2 may be different from each other. In the case of setting the threshold values 1 and 2 different from each other, it is preferable that the threshold value 2 is larger than the threshold value 1.

The flash determination section 208 determines whether at least a predetermined number of consecutive lines have line difference values of not less than the threshold value 1 and have block difference values of not less than the threshold value 2. If it is determined that at least the predetermined number of consecutive lines have line and block difference values of not less than the threshold value 1 and 2, respectively, the flash determination section 208 determines discontinuous image brightness due to a flash.

If it is determined that there is a flash, the flash determination section 208 outputs: data indicating the number of the first line (as the start time of the flash) that has a line difference value of not less than the threshold value 1 and includes blocks each having a block difference value of not less than the threshold value 2; and data indicating the number of the first line that does not satisfy at least one of the conditions that the line difference value is not less than the threshold value 1 and each block difference value is not less than the threshold value 2. The flash determination unit 208 also outputs the detection signal indicating that there is a flash.

Figure 8A:
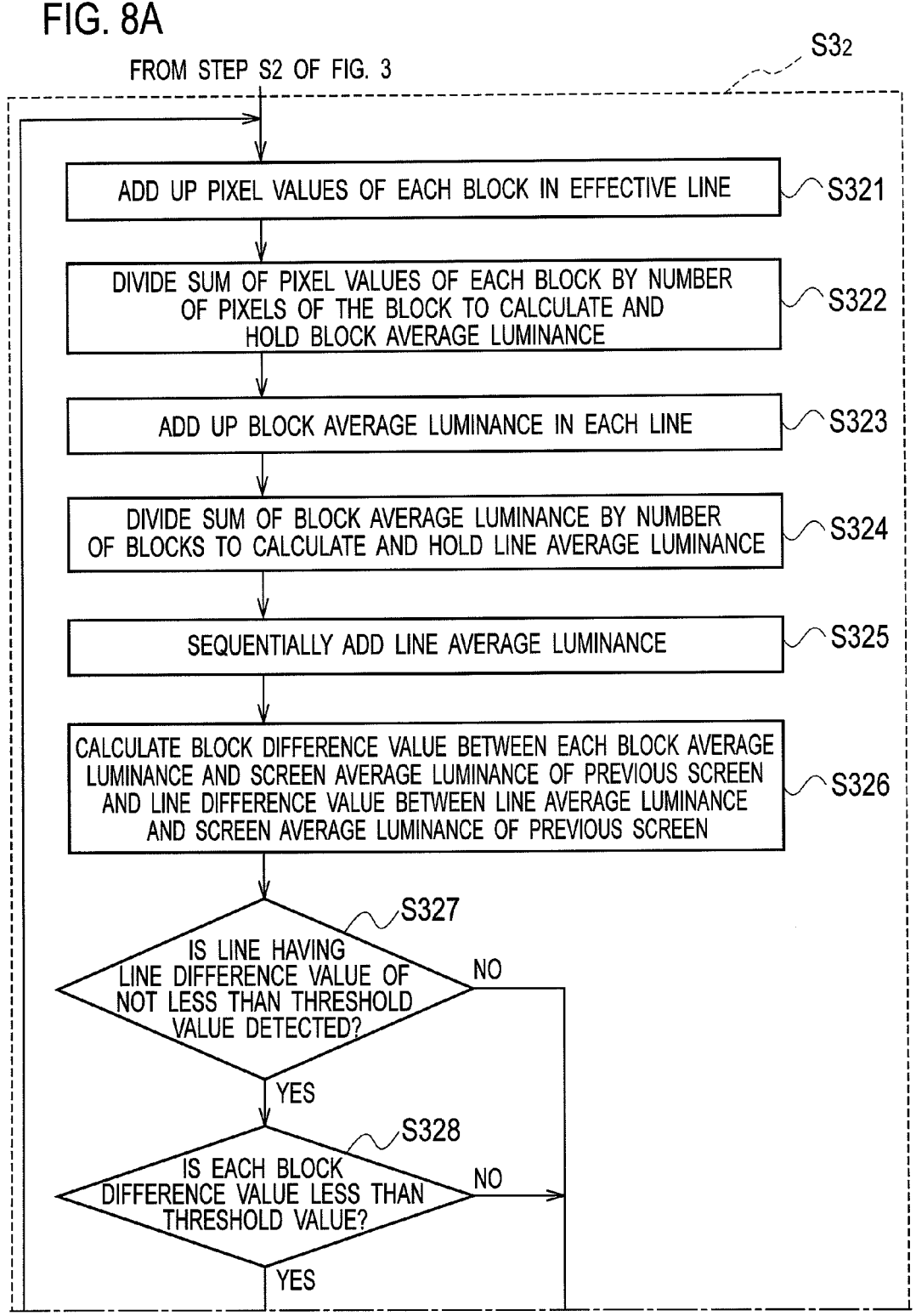
FIGS. 8A and 8B are a flowchart showing details of a flash detection and correction processes of the second embodiment.
Figure 8B:
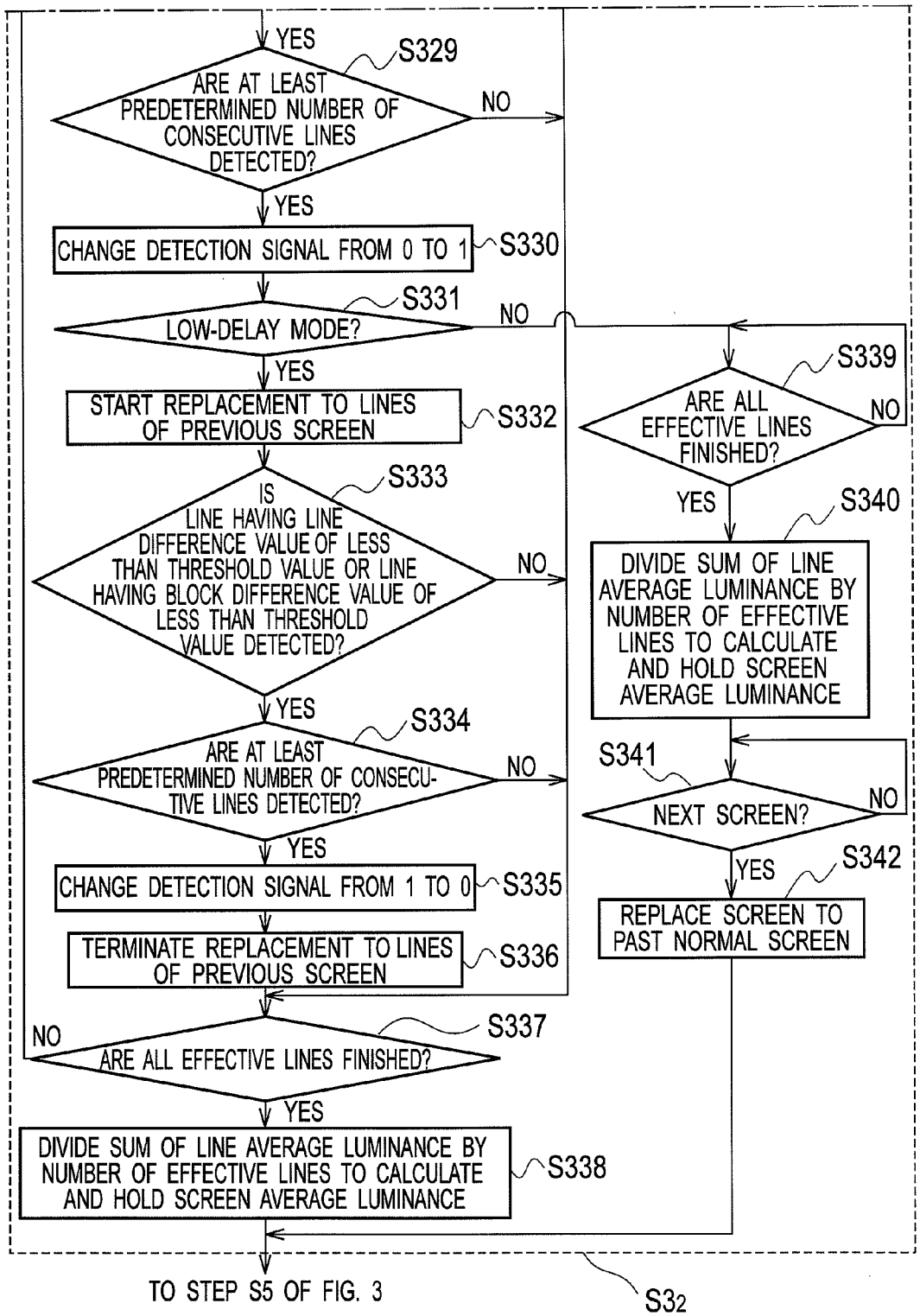

In the second embodiment, the flash detection and correction processes of the step 3 shown in FIG. 3 correspond to the processes of step $S3_2$ shown in FIGS. 8A and 8B. The flash detection and correction processes of the step $S3_2$ are described in detail with reference to FIGS. 8A and 8B.

In FIG. 8A, in step S321, the flash detection unit 20 sequentially executes the process of adding up pixel values of the effective pixels of each block of effective lines effective line by effective line. In step S322, the flash detection unit 20 divides the sum of the pixel values in each block, which is obtained in the step S321, by the number of effective pixels of the block to calculate the block average luminance thereof and holds the calculated block average luminance.

In step S323, the flash detection unit 20 adds up the block average luminances of each line and in step S324 and divides the sum of the block average luminances by the number of blocks of the line to calculate the line average luminance. The flash detection unit 20 then holds the calculated line average luminance. In step S325, the flash detection unit 20 executes the process of sequentially adding up the line average luminances.

In step S326, the flash detection unit 20 executes the process of calculating the difference between each block average luminance, which is calculated in the step S322, and the screen average luminance of the previous screen (block difference value) and the process of calculating the difference between the line average luminance, which is calculated in the step S324, and the screen average luminance of the previous screen (line difference value). The difference calculation process of the step S326 is executed each time the line average luminance is calculated in the step S324.

In step S327, the flash detection unit 20 determines whether a line that has a line difference value of not less than the threshold value (threshold value 1) is detected. The flash determination section 208 performs the determination in the steps S327 to S329, S333, and S334.

If it is determined that a line that has a line difference value of not less than the threshold value (threshold value 1) is detected (YES), the flash detection unit 20 moves the process to step S328. If it is not determined that a line that has a line difference value of not less than the threshold value (threshold value 1) is detected, the flash detection unit 20 moves the process to step S337. If there is no line that has a line difference value of not less than the threshold value, it is determined that there is no flash.

If a line that has a line difference value of not less than the threshold value is detected, in step S328, the flash detection unit 20 further determines whether the block difference value of each block is less than the threshold value (threshold value 2).

If it is not determined that each block difference value is less than the threshold value (NO), the flash detection unit 20 moves the process to step S329. At this time, the flash detection unit 20 stores the detected line information about how many lines are included between the detected line and the first line of the frame. If some consecutive lines have line difference values of not less than the threshold value and include blocks each having a block difference value of not less than the threshold value, the detected line information may include information about only the first line of the consecutive lines.

On the other hand, if it is determined that each block difference value is not less than the threshold value (YES), the flash detection unit 20 deletes the detected line information already stored and moves the process to step S337.

In step S329, the flash detection unit 20 determines whether at least the predetermined number of consecutive lines each satisfy the two conditions, in which the line difference value is not less than the threshold value and the block difference values of the line are not less than the threshold value. The state satisfying these two conditions is referred to as a particular state. If it is determined that at least the predetermined number of consecutive lines are in the particular state (YES), the flash detection unit 20 moves the process to step S330. If it is not determined that at least the predetermined number of consecutive lines are in the particular state (NO), the flash detection unit 20 moves the process to step S337.

In the second embodiment, it is determined that there is a flash if at least the number of consecutive lines are in the particular state satisfying the aforementioned two conditions. Even if at least the predetermined number of consecutive lines have line difference values of not less than the threshold value, it is determined that there is no flash when one of the conditions that the block difference values of each line are not less than the threshold value is not fulfilled. The reason therefor is described later.

When at least the predetermined number of consecutive lines are in the particular state satisfying the above two conditions, in step S330, the flash detection unit 20 changes the detection signal "0", that indicates that there is no flash, to the detection signal "1", that indicates that there is a flash. The flash detection unit 20 supplies the detection signal "1" and the stored detected line information to the flash correction unit 8 and then deletes the detected line information.

In step S331, the flash detection unit 20 and flash correction unit 8 determine whether the set mode is the low-delay mode. If it is determined that the set mode is the low-delay mode (YES), the flash correction unit 8 moves the process to step S332. If it is not determined that the set mode is the low-delay mode (NO), the flash detection unit 20 moves the process to step S339.

In the step S332, the flash correction unit 8 starts replacement with lines of the previous screen, that are indicated by the supplied detected line information. In step S333, the flash detection unit 20 determines whether a line that has a line difference value of less than the threshold value or includes at least one block having a difference value of less than the threshold value is detected. In other words, the flash detection unit 20 determines in step S333 whether a line not satisfying at least one of the aforementioned two conditions is detected.

If it is determined that a line that does not satisfy at least one of the aforementioned two conditions is detected (YES), the flash detection unit 20 moves the process to step S334. At this time, the flash detection unit 20 stores the detected line information indicating how many lines are included between the detected line and the first line of the frame. When some consecutive lines do not satisfy the two conditions, the stored detected line information may include information about only the first line.

On the other hand, if it is not determined that a line that satisfies both of the aforementioned two conditions is detected (NO), the flash detection unit 20 deletes the stored detected line information and moves the process to step S337.

In the step S334, the flash detection unit 20 determines whether at least the predetermined number of consecutive lines do not satisfy both of the two-conditions. If it is not determined that at least the predetermined number of consecutive lines do not satisfy both of the two-conditions (NO), the flash detection unit 20 moves the process to step S335. If it is determined that at least the predetermined number of consecutive lines do not satisfy both of the two-conditions (YES), the flash detection unit 20 moves the process to step S337.

In step S335, the flash detection unit 20 changes the detection signal "1" to the detection signal "0" and supplies the detection signal "0" and the stored detected line information with the flash correction unit 8. The flash detection unit 20 then deletes the stored detected line information. In step S336, the flash correction unit 8 terminates the replacement to lines of the previous screen, that are indicated by the supplied detected line. The flash detection unit 20 moves the process to step S337.

In step S337, the flash detection unit 20 determines whether the determination is finished for all of the effective lines. If it is determined that the determination is finished for all of the effective lines (YES), the flash detection unit 20 moves the process to step S338. If it is not determined that the determination is finished for all of the effective lines (NO), the flash detection unit 20 returns the process to step S321 and repeats step S321 and subsequent steps.

In step S338, the flash detection unit 20 divides the sum of the line average luminances by the number of effective lines of the screen to calculate the screen average luminance and holds the calculated screen average luminance. The flash detection unit 20 then moves the process to step S5 of FIG. 3.

On the other hand, if it is not determined in step S331 that the set mode is the low-delay mode (the set mode is the screen-based mode), the flash detection unit 20 performs the same steps S316 to S319, and the description thereof is omitted.

In the second embodiment, similarly to the first embodiment, it is preferable that the threshold value compared with each line difference value in step S333 is smaller than the threshold value compared with each line difference value in step S327.

According to the second embodiment, the accuracy in detecting that there is a flash is higher than that of the first embodiment.

Figure 9:
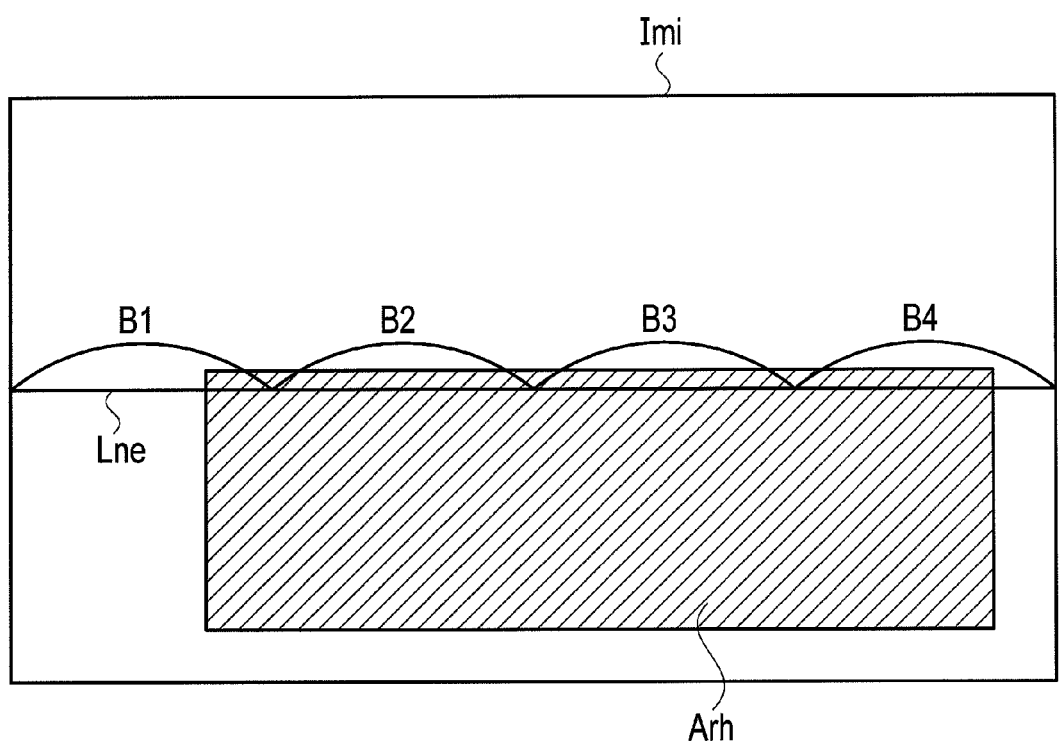
FIG. 9 is a view for explaining an effect of the second embodiment.

A description is given of the reason for improving the detection accuracy using FIG. 9. FIG. 9 shows an example of an image Imi having a screen partially including a high luminance rectangular area Arh. It is assumed that the hatched high luminance area Arh has a white level, for example. The high luminance area Arh is not necessarily rectangular. On an effective line Lne, the line average luminance is comparatively high. The lines other than the effective line Lne in a vertical range of the part where the high luminance area Arh exists have also high line average luminance. Accordingly, in the first embodiment, it can be incorrectly determined that there is a flash in the vertical range of the part in which the high luminance area Arh exists.

In the example shown in FIG. 9, one line is divided into four blocks B1 to B4. The block average luminance of the block B1, which is calculated by the block average calculation section 201, is not so high. The blocks B2 and B3 have high block average luminance, and the block B4 has a block average luminance lower than that of the blocks B2 and B3. Concerning the effective line Lne, even if it is determined at step S327 of FIG. 8A that the line difference value of the effective line Lne is not less than the threshold value, it is determined at step S328 that the block difference value of at least the block B1 is less than the threshold value.

According to the second embodiment, therefore, it is possible to considerably reduce the possibility of erroneous determination of a flash even in the image Imi partially including the high luminance area Arh as shown in the example of FIG. 9.

Third Embodiment

The configuration of an image processing device of the third embodiment is the same as the video camera 101 of the first embodiment shown in FIG. 1 or the video camera 102 of the second embodiment shown in FIG. 7 except the process of correcting image data by the flash correction unit 8. The process of correcting image data in the third embodiment is described with reference to FIGS. 10 to 12.

Figure 10A:
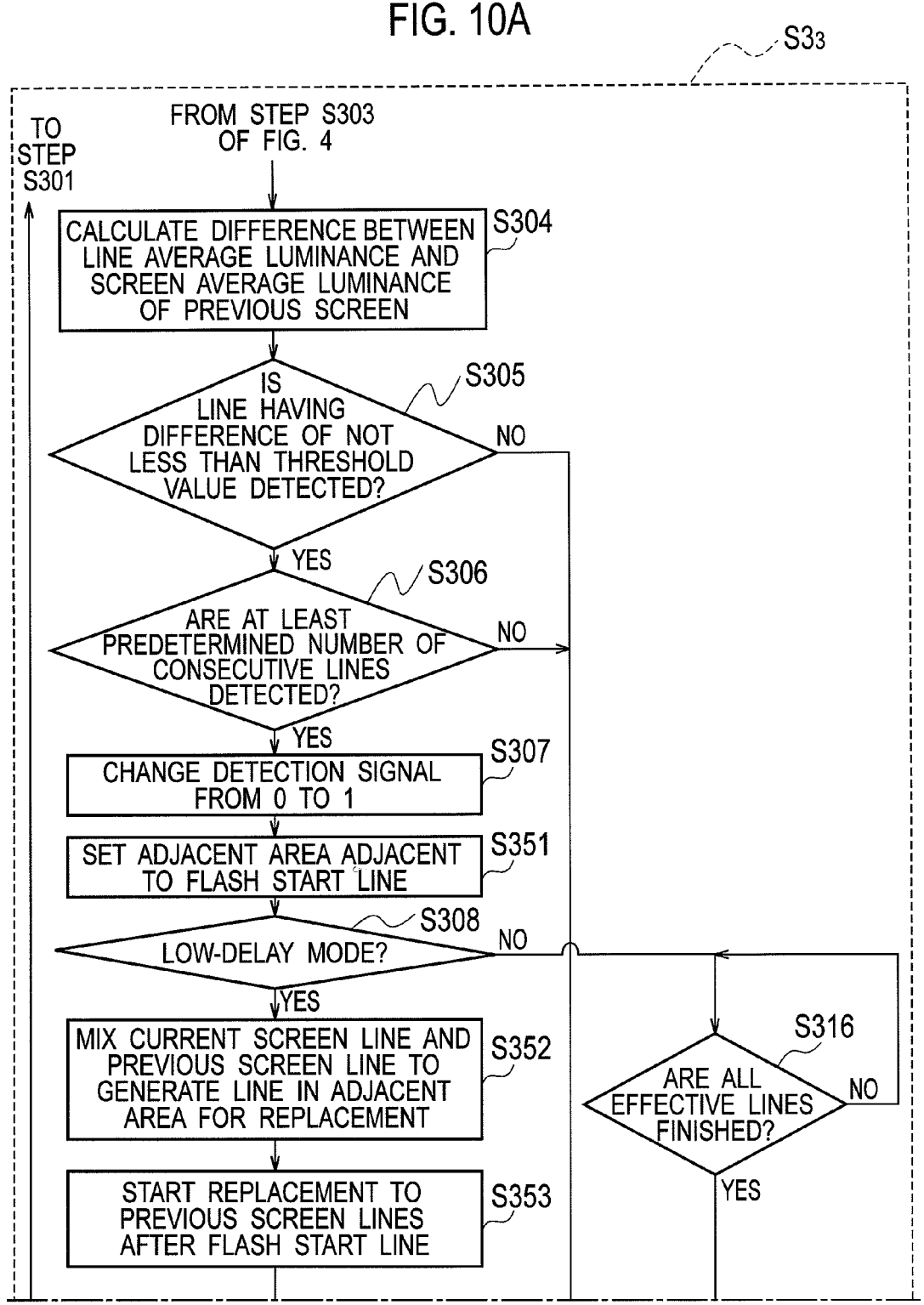
FIGS. 10A and 10B are a flowchart showing details of a flash detection and correction processes of the third embodiment.
Figure 10B:
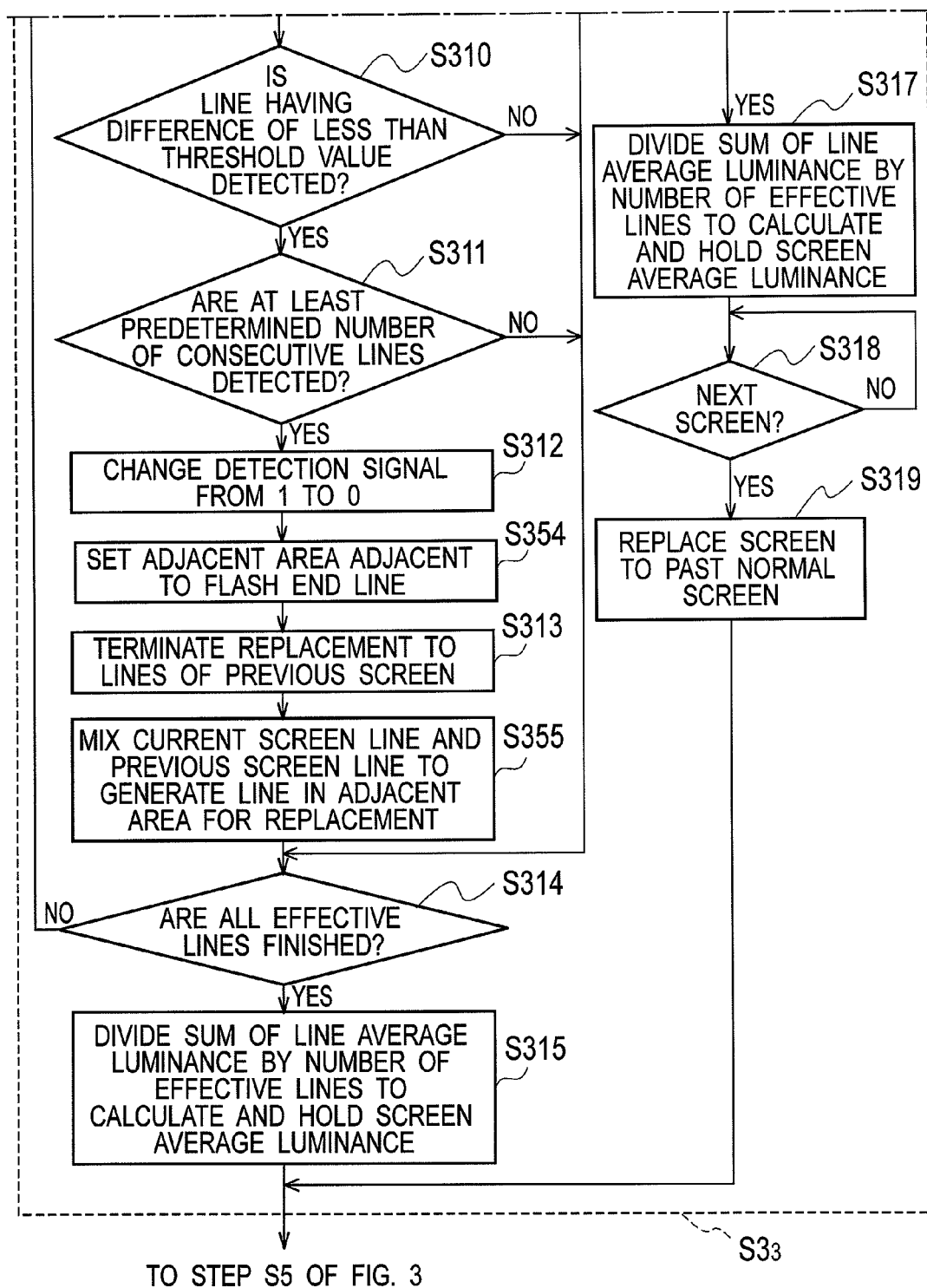

In the third embodiment, the flash detection and correction processes of step S3 shown in FIG. 3 corresponds to step $S3_3$ shown in FIGS. 10A and 10B. The flash detection and correction processes of the step $S3_3$ are described in detail with reference to FIGS. 10A and 10B.

In the example of FIGS. 10A and 10B, the configuration of the image processing device is the same as that of the video camera 101 of FIG. 1 that includes the flash detection unit 2. The video camera 102 of FIG. 7 including the flash detection unit 20, that is not particularly shown, is capable of performing the same processes as those of the step $S3_3$ of FIGS. 10A and 10B. In FIGS. 10A and 10B, the same steps as those of FIGS. 4A and 4B are given the same reference numerals, and the description thereof is properly omitted.

In FIG. 10A, the steps before step S304 are the same as those of FIG. 4A and are not shown in the flowchart. Steps S304 to S307 in FIG. 10A are the same as those of FIG. 4A. In step S307, the flash detection unit 2 changes the detection signal "0", that indicates that there is no flash, to the detection signal "1", that indicates that there is a flash, and supplies the detection signal "1" and the stored detected line information to the flash correction unit 8. At step S351, the flash detection unit 2 then sets an adjacent area which is located above the flash start line indicated by the supplied detected line information and is adjacent to the flash start line.

Figure 11A:
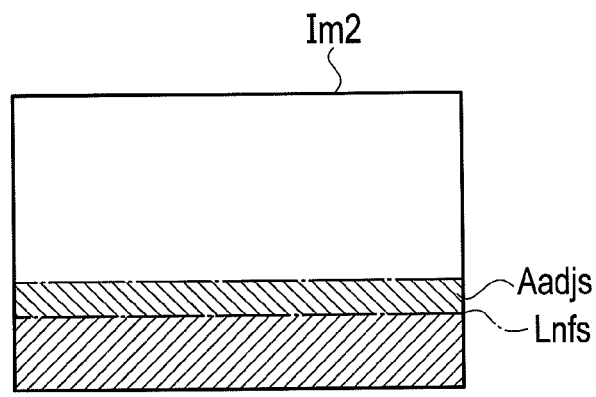
FIG. 11A is a view showing an adjacent area adjacent to a flash start line for explaining the operation of the third embodiment.

Specifically, as shown in FIG. 11A, the flash correction unit 8 sets an adjacent area Aadjs composed of plural lines adjacent to a flash start line Lnfs that is the first flash detected line indicated by the supplied detected line information. The adjacent area Aadjs includes about five to ten lines, for example.

When it is determined that the set mode is the low delay mode, in step S352, the flash correction unit 8 mixes the lines of the current screen and the lines of the previous screen to generate new lines for the adjacent area Aadjs and replaces the lines of the adjacent area Aadjs with the new lines. At step S353, the flash correction unit 8 starts replacement with the lines of the previous screen beginning with the flash start line Lnfs.

In step S312, the flash detection unit 2 changes the detection signal "1" to the detection signal "0" and supplies the detection signal "0" and the stored detected line information to the flash correction unit 8. In step S355, the flash detection unit 8 sets an adjacent area which is located under the flash end line indicated by the supplied detected line information (the line just before the first line after the end of the flash, which is detected at the step S310) and is adjacent to the flash end line.

Figure 11B:
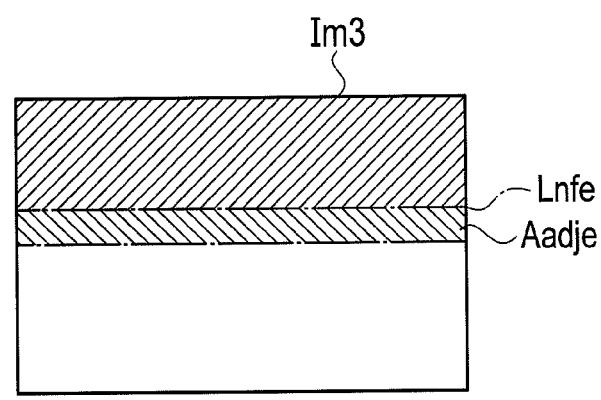
FIG. 11B is a view showing an adjacent area adjacent to a flash end line for explaining the operation of the third embodiment.

As shown in FIG. 11B, specifically, the flash correction unit 8 sets an adjacent area Aadje composed of plural lines which are adjacent to a flash end line Lnfe. The adjacent area Aadje also includes about five to ten lines, for example.

The flash correction unit 8 terminates the replacement with the lines of the previous screen in step S313. The flash correction unit 8, then in step S355, mixes the lines of the current screen and the lines of the previous screen in the adjacent area Aadje to generate new lines for the adjacent area Aadje and replaces the lines of the adjacent area Aadje with the new lines. The processes of the other steps are the same as described in FIGS. 4A and 4B.

In FIG. 11A, a synthesis weighting factor Wf(i, j) of image data of the current screen and a synthesis weighting factor Wb(i, j) of image data of the previous screen are expressed by Equation (1). Herein, LS is the position of the first line in the adjacent area Aadjs; LE, the position of the last line in the adjacent area Aadjs; and Lf (i, j), the pixel position of the adjacent area Aadjs. In step S352 of FIG. 10A, the lines of the current screen are mixed with the corresponding lines of the previous screen based on Equation (1) to generate new lines for the adjacent area Aadjs.

In Equation (1), the pixel position is represented by Lf(i, j). However, the image data of the previous screen and the image data of the current screen are mixed line by line, and accordingly, the information of i indicating the horizontal position of an image is not necessary.

$$Wf(i, j) = \begin{cases} 1 & \text{where } Lf(i, j) < LS \\ \frac{LE - Lf(i, j)}{LE - LS} & \text{where } LS \leq Lf(i, j) \leq LE \\ 0 & \text{where } LE < Lf(i, j) \end{cases} \quad (1)$$

$$Wb(i, j) = 1 - Wf(i, j)$$

In FIG. 11B, the synthesis weighting factor Wf(i, j) of image data of the current screen and the synthesis weighting factor Wb(i, j) of image data of the previous screen are expressed by Equation (2). Herein, LS is the position of the first line in the adjacent area Aadje; LE, the position of the last line in the adjacent area Aadje; and Lf(i, j), the pixel position in the adjacent area Aadje. In Equation (2), similarly, the pixel position is represented by Lf(i, j). However, the image data of the previous screen and the image data of the current screen are mixed line by line, and accordingly, the information of i indicating the horizontal position of an image is not necessary.

$$Wf(i, j) = \begin{cases} 0 & \text{where } Lf(i, j) < LS \\ \frac{Lf(i, j) - LS}{LE - LS} & \text{where } LS \leq Lf(i, j) \leq LE \\ 1 & \text{where } LE < Lf(i, j) \end{cases} \quad (2)$$

$$Wb(i, j) = 1 - Wf(i, j)$$

Figure 12A:
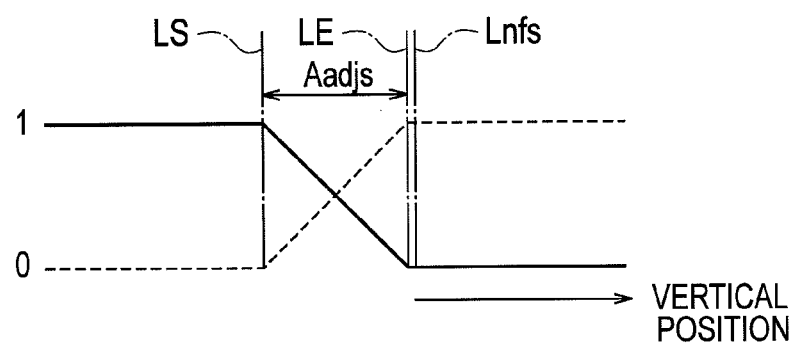
FIG. 12A is a diagram for explaining the operation by the third embodiment, showing the mixing characteristic of a line of the current screen and a line of a previous screen in the adjacent area adjacent to the flash start line.

FIG. 12A shows the mixing characteristics by Equation (1). In FIG. 12A, the solid line represents a mixed proportion of a current screen line, and the dashed line represents a mixed proportion of a previous screen line.

As shown in FIG. 12A, in the case of the image Im2 shown in FIG. 11A, the part of the screen from the upper end of the screen to just short of the adjacent area Aadjs is composed of only the lines of the previous screen. The proportion of current screen line gradually decreases starting from the first line LS in the adjacent area Aadjs to the last line LE while the proportion of previous screen line gradually increases. The part of the screen below the last line LE is composed of only the lines of the previous screen by step S353. The flash start line Lnfs may be configured to correspond to the last line LE.

Figure 12B:
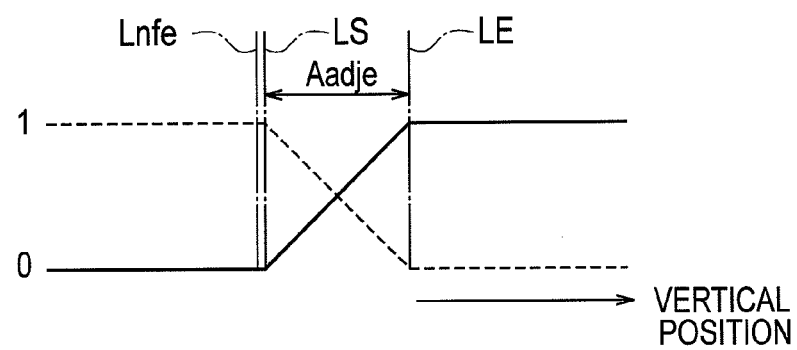
FIG. 12B is a diagram for explaining the operation by the third embodiment, showing the mixing characteristic of a line of the current screen and a line of a previous screen in the adjacent area adjacent to the flash end line.

FIG. 12B shows the mixing characteristics of a current screen line and a previous screen line by Equation (2). In FIG. 12B, the solid line represents a proportion of a current screen line, and the dashed line represents a proportion of a previous screen line.

As shown in FIG. 12B, in the case of the image Im3 shown in FIG. 11B, the part of the screen from the upper end thereof to just short of the adjacent area Aadje is composed of only the lines of the previous screen. The proportion of the current screen line gradually decreases starting from the first line LS in the adjacent area Aadje to the last line LE while the proportion of the previous screen line gradually increases. The part of the screen below the last line LE is composed of only the lines of the current screen. The flash start line Lnfe may be configured to correspond to the first line LS.

According to the third embodiment, in the case where lower part of the screen has high luminance like the image Im2 of FIG. 2, in the adjacent area Aadjs which is located above the flash start line Lnfs and is not influenced by the flash, the current screen line gradually changes to the previous screen line from the first line LS to the last line LE. This can reduce unnatural looking due to mixing of the image data of the current screen and the image data of the previous screen.

Instead of Equations (1) and (2), the image data of the current screen and the image data of the previous screen may be mixed pixel by pixel using Equation (3). In Equation (3), Mf(i, j) is brightness of a pixel, and ThH and ThL are threshold values for brightness, that satisfy ThH>ThL. In this case, the brightness of each effective pixel detected by the flash detection unit 2 or 20 may be inputted to the flash correction unit 8.

$$Wf(i, j) = \begin{cases} 1 & \text{where } Mf(i, j) < ThL \\ \frac{ThH - Mf(i, j)}{ThH - ThL} & \text{where } ThL \leq Mf(i, j) \leq ThH \\ 0 & \text{where } ThH < Mf(i, j) \end{cases} \quad (3)$$

$$Wb(i, j) = 1 - Wf(i, j)$$

According to Equation (3), in the adjacent areas Aadjs and Aadje, if the brightness Mf(i, j) of each pixel is smaller than the small threshold value ThL, the synthesis weighting factor Wf(i, j) for the image data of the current screen is 1, and the synthesis weighting factor Wb(i, j) for the image data of the current screen is 0. In other words, if the brightness Mf(i, j) of a pixel is smaller than the small threshold value TjL, the pixel is likely to be not influenced by a flash. Accordingly, only the image data of the current screen is used for the pixel.

On the other hand, if the brightness Mf(i, j) of each pixel is larger than the large threshold value ThH, the synthesis weighting factor Wf(i, j) for the image data of the current screen is 0, and the synthesis weighting factor Wb(i, j) for the image data of the current screen is 1. In other words, if the brightness Mf(i, j) of a pixel is larger than the large threshold value ThH, the pixel is likely to be influenced by a flash. Accordingly, only the image data of the previous screen is used for the pixel.

If the brightness Mf(i, j) of each pixel is not less than the threshold value Th and not more than the threshold value ThH, the pixel data of the current screen and the pixel data of the previous screen are adaptively mixed according to the characteristics of Equation (3).

Fourth Embodiment

The configuration of an image processing device of a fourth embodiment is the same as that of the video camera 102 of the second embodiment shown in FIG. 7 and differs from the second embodiment in the process of detecting a flash by the flash detection unit 20. The process of detecting a flash in the fourth embodiment is described with reference to FIGS. 13A and 13B and FIG. 14.

Figure 13A:
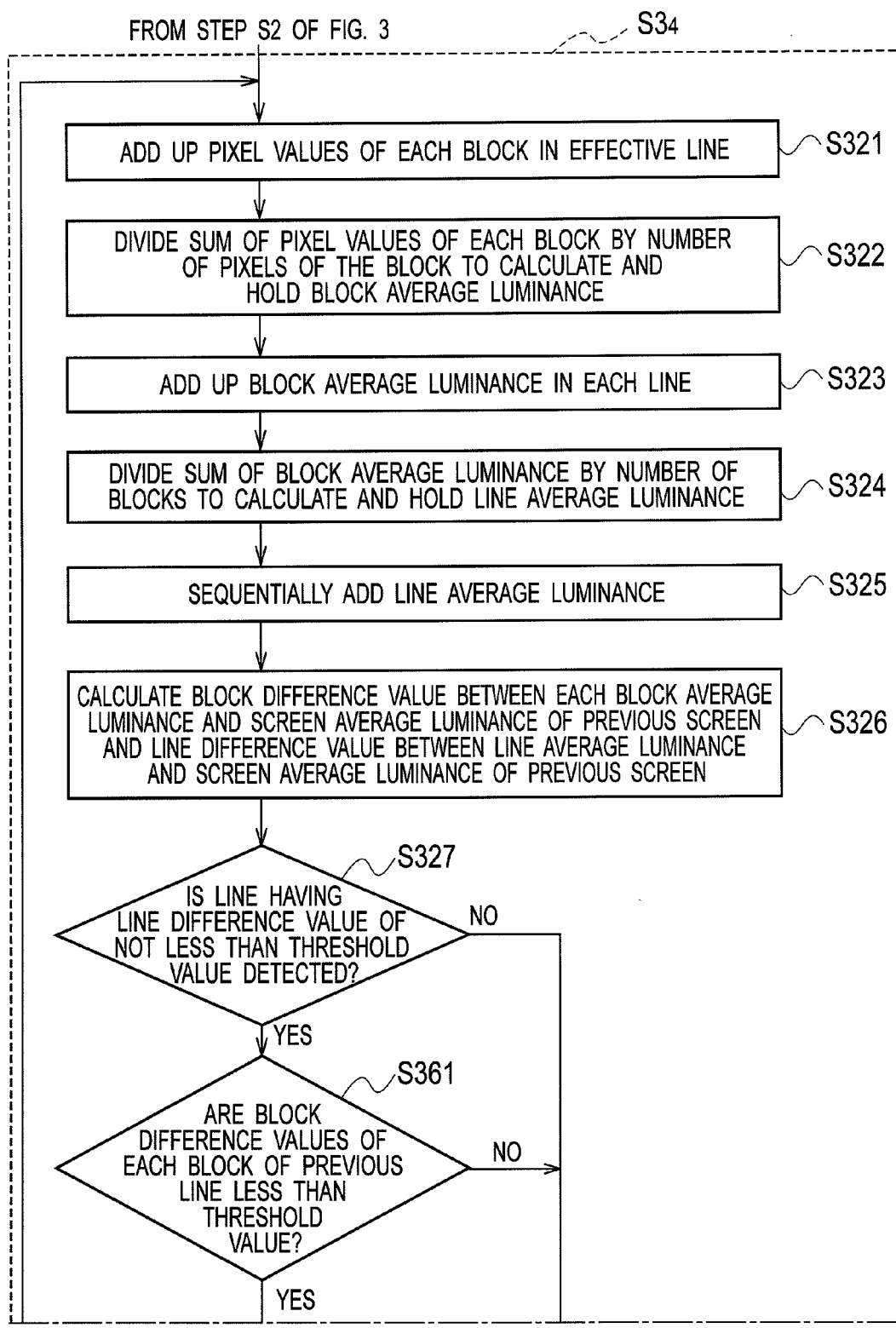
FIGS. 13A and 13B are a flowchart showing details of a flash detection and correction processes of a fourth embodiment.
Figure 13B:
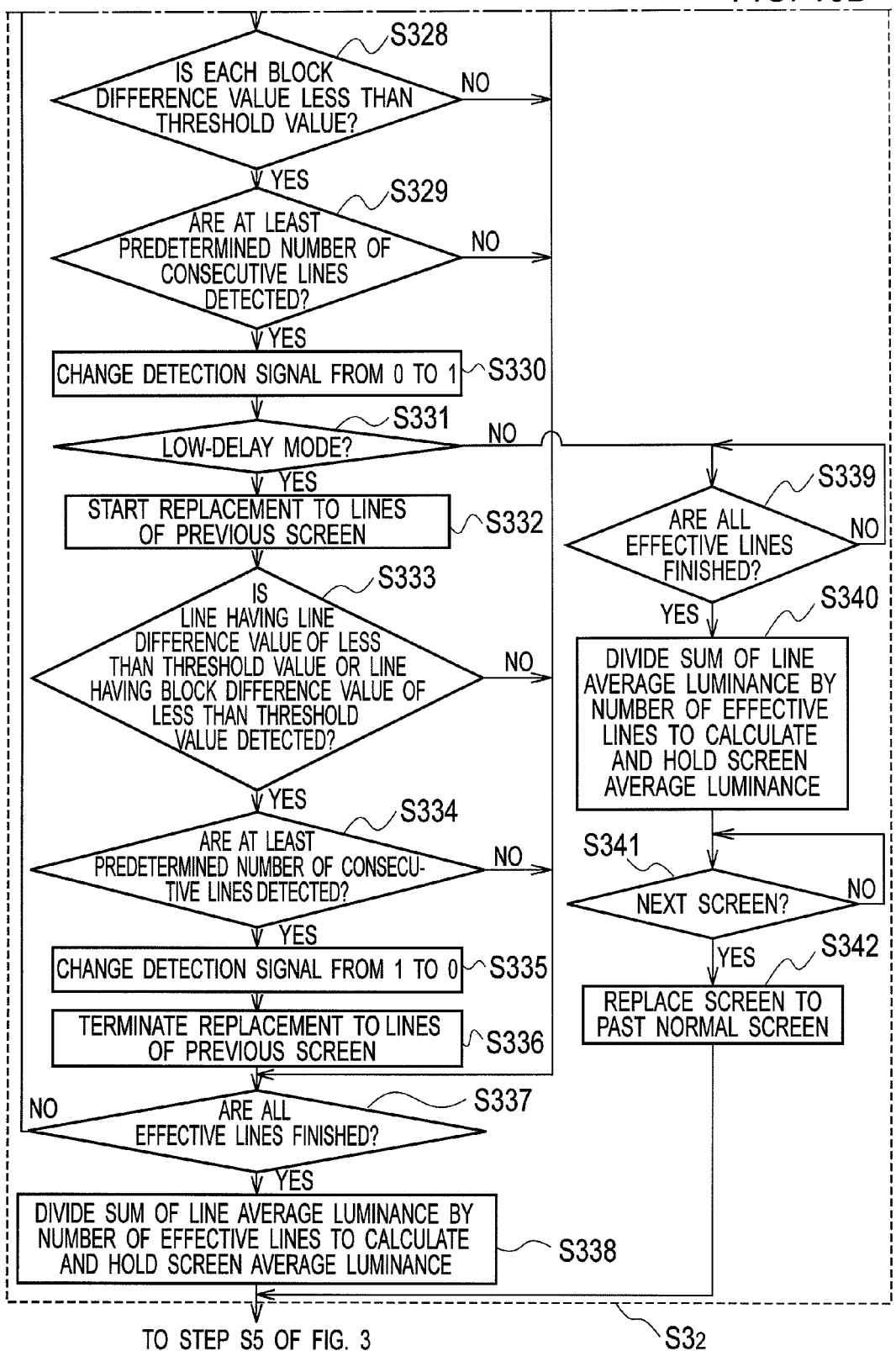

In the fourth embodiment, the flash detection and correction processes of the step S3 shown in FIG. 3 corresponds to step S3$_4$ shown in FIGS. 13A and 1313. The flash detection and correction processes of the step S3$_4$ are described in detail with reference to FIGS. 13A and 13B. In FIGS. 13A and 13B, the same steps as those in FIGS. 8A and 8B are given the same reference numerals, and the description thereof is properly omitted.

The process of the steps S321 to S326 is the same as that of FIG. 8A. In step S327, the flash detection unit 20 determines whether a line that has a line difference value of not less than the threshold value (threshold value 1) is detected. If it is determined that a line that has a line difference value of not less than the threshold value (YES) is detected, the flash detection unit 20 moves the process to step S361. If it is not determined that a line that has a line difference value of not less than the threshold value is detected (NO), the flash detection unit 20 moves the process to step S337.

If a line that has a line difference value of not less than the threshold value is detected, in step S361, the flash detection unit 20 determines whether all of the blocks of the previous line have block average luminances of not less than a threshold value. The threshold value used in step S361 may be equal to the threshold value 2 used in step S328 or may be a little different from the same. Herein, the threshold value used in step S361 is set equal to the threshold value 2.

If it is determined that all of the blocks of the previous line have block difference values of less than the threshold value (threshold value 2) (YES), the flash detection unit 20 moves the process to step S328. If any one of the blocks of the previous line has a block difference value of not less than the threshold value (threshold value 2) (NO), the flash detection unit 20 moves the process to step S337.

The process of the step S328 and subsequent steps is the same as that of FIGS. 8A and 8B. In step S329, the flash detection unit 20 determines whether at least the predetermined number of consecutive lines are in the particular state, that satisfies the two conditions where the line difference value is not less than the threshold value and each block difference values is not less than the threshold value.

In the fourth embodiment, only when it is determined in step S361 that all of the blocks in the previous line have block difference values of less than the threshold value, it is determined that the current line is in the particular state, and the process of the step S329 is executed.

Figure 14:
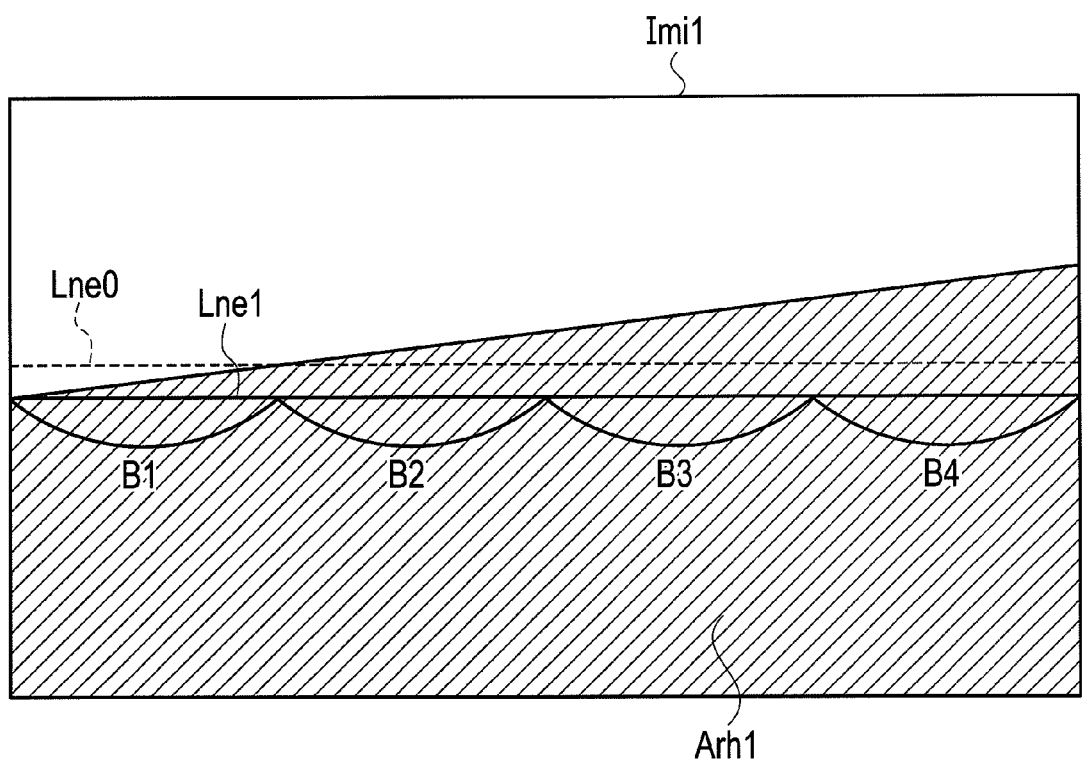
FIG. 14 is a diagram for explaining the effects of the fourth and fifth embodiment.

The effect of providing step S361 is described using FIG. 14. FIG. 14 shows an example of an image Imi1 that includes the screen partially having a high luminance trapezoidal area Arh1, for example. The high luminance trapezoidal area Arh1, which is hatched in the drawing, has a white level, for example. The high luminance area Arh1 is not necessarily trapezoidal. The upper end of the high luminance area may vary depending on the position in the horizontal direction. Herein, it is assumed that the image one frame before the image Imi1 is a normal image not including the high luminance area Arh1.

For easy understanding, in FIG. 14, an effective line Lne0 just before the effective line Lne1 in the high luminance area Arh1 is located as shown in the drawing. On the effective line Lne0, the block difference value of the block B1 is comparatively small, but the block difference values of the blocks B2 to B4 are comparatively large. Accordingly, when the effective line Lne1 is the current line, all the blocks on the previous line do not have block difference values of less than the threshold value.

Accordingly, by process of step S361, the flash detection unit 20 does not falsely detect that the high luminance area Arh1 is a high luminance area due to a flash.

When the current line is the effective line Lne1 or subsequent lines, all of the blocks B1 to B4 have comparatively high block difference values. In a similar manner, therefore, by the process of step S361, the flash detection unit 20 does not falsely detect that the high luminance area Arh1 is a high luminance area due to a flash.

In the fourth embodiment, the difference calculation section 207 only needs to hold the block difference values of the blocks of the previous line.

According to the fourth embodiment, it is determined whether the block difference values of the line just before the current line are less than the threshold value. However, it may be determined whether the block difference values of the line two or three lines before the current line are less than the threshold value. In other words, it should be determined whether the block difference values in a line which is located above and near the current line are less than the threshold value. The order of the steps S327, S361, and S328 is not limited to the order shown in FIGS. 13A and 13B and may be properly changed.

In the fourth embodiment, similarly to the first embodiment, the threshold value compared with the line difference value in the step S333 is preferably smaller than the threshold value compared with the line difference value in step S327.

Preferably, the configurations of the fourth and third embodiments are combined.

Fifth Embodiment

The configuration of the image processing device of a fifth embodiment is the same as that of the video camera 102 of the second embodiment shown in FIG. 7 and differs from that of the second embodiment in the process of detecting a flash by the flash detection unit 20. The process of detecting a flash of the fifth embodiment is described with reference to FIGS. 15A and 15B.

Figure 15A:
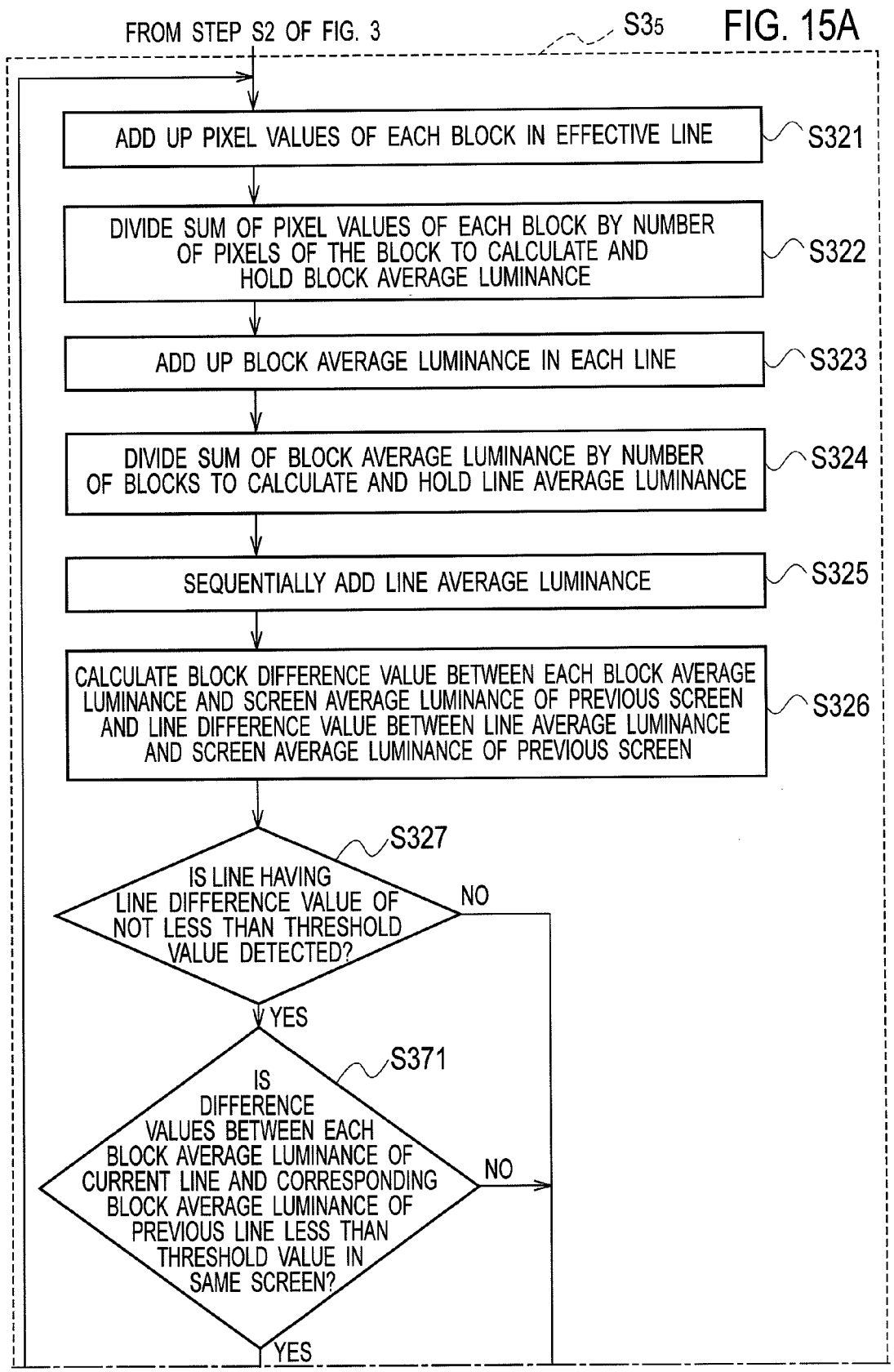
FIGS. 15A and 15B are a flowchart showing details of a flash detection and correction processes of a fifth embodiment.
Figure 15B:
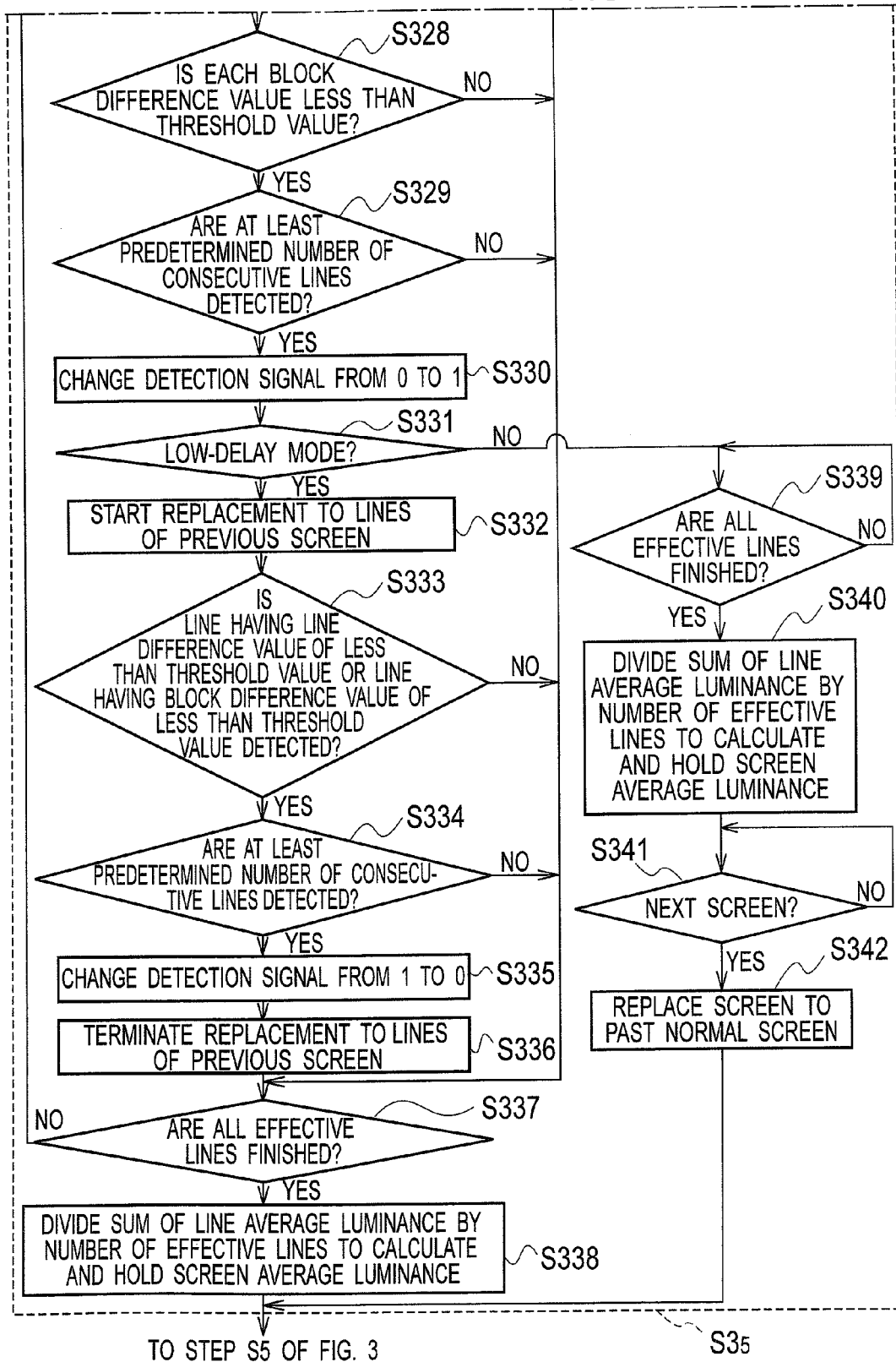

In the fifth embodiment, the flash detection and correction processes of step S3 shown in FIG. 3 corresponds to step $S3_5$ shown in FIGS. 15A and 15B. The flash detection and correction processes of step $S3_5$ is described in detail with reference to FIGS. 15A and 15B. In FIGS. 15A and 15B, the same steps as those of FIGS. 8A and 8B are given the same reference numerals, and the description thereof is properly omitted.

The process of steps S321 to S326 is the same as that of FIG. 8A. In step S327, the flash detection unit 20 determines whether a line having a line difference value of not less than the threshold value (threshold value 1) is detected. If it is determined that a line that has a line difference value of not less than the threshold value is detected (YES), the flash detection unit 20 moves the process to step S371. If it is not determined that a line that has a line difference value of not less than the threshold value is detected (NO), the flash detection unit 20 moves the process to step S337.

If a line that has a line difference value of not less than the threshold value is detected, in step S371, the flash detection unit 20 determines whether, in the same screen as the current line, the difference value between each block average luminance of the current line and the corresponding block average luminance of the previous line is not less than a predetermined threshold value.

The flash detection unit 20 compares the block average luminances of blocks at the same horizontal position in the current and previous lines. The threshold value used in step S371 (threshold value 3) is unnecessarily equal to the threshold value 2 used in the step S328 and may be set to a proper value.

If it is determined that the difference value between each block average luminance of the current line and the corresponding block average luminance of the previous line is not less than the predetermined threshold value (YES), the flash detection unit 20 moves the process to step S328. If the difference value between any one block average luminance of the current line and the corresponding block average luminance of the previous line is less than the predetermined threshold value (NO), the flash detection unit 20 moves the process to step S337.

The process in step S328 and subsequent steps are the same as that of FIGS. 8A and 8B. In the fifth embodiment, only when it is determined that the difference values between all the block average luminances of the current line and the block average luminances of the previous line are equal to or more than the predetermined threshold value, the current line is determined to be a line in the particular state, and the process of step S329 is executed.

The effect of providing the step S371 is described with reference to FIG. 14. In FIG. 14, it is assumed that the effective line Lne1 is the current line, and in the fifth embodiment, the block average luminances of blocks B1 to B4 in the effective line Lne1 are compared with those of blocks B1 to B4 in the previous effective line Lne0, respectively. The difference value of the block average luminance between the blocks B1 of the current and previous effective lines Lne1 and Lne0 is not less than the threshold value, but the difference values of the blocks B2 to B4 are less than the threshold value. In the cases where the current line is the effective line Lne0 or a line above the effective line Lne0, similarly, it is not determined that the differences of all the blocks are equal to or more than the threshold value.

Accordingly, by the process of step S371, the flash detection unit 20 cannot falsely detect that the high luminance area Arh1 is a high luminance area due to a flash.

When the current line is the effective line Lne1 or a line after the same, at each block B1 to B4 of the current line, the difference value in the block average luminance between the current line and the previous line is comparatively small. Accordingly, in a similar manner, by the process of step S371, the flash detection unit 20 cannot falsely detect that the high luminance area Arh1 is a high luminance area due to a flash.

In the fifth embodiment, the difference calculation section 207 only needs to hold the block average luminances of the blocks of the previous line and calculate the difference values in block average luminance between the blocks of the previous line and the corresponding blocks of the current line.

According to the fifth embodiment, even in the image Imi1 including the high luminance area Arh1 like the example of FIG. 14, the possibility of false positives in detecting a flash can be further reduced compared with the second embodiment.

In the fifth embodiment, it is determined whether the difference value between each block average luminance of the current line and the corresponding block average luminance of the previous line is less than a threshold value. However, it may be determined whether the difference values of each block average luminance of the current line and the corresponding block average luminance of a line two or three lines before the current line is less than a threshold value.

Specifically, in the same screen, it is only necessary to determine whether the difference value between each block average luminance of the current line and the corresponding block average luminance of a line above and near the current line is less than the threshold value. The order of the steps S327, S371, and S328 is not limited to the order shown in FIGS. 15A and 15B and may be properly changed.

In the fifth embodiment, similarly to the first embodiment, the threshold value compared with the line difference value in the step S333 is preferably smaller than the threshold value compared with the line difference value in the step S327.

Preferably, the above-described configurations of the fifth and third embodiments are combined. The configurations of the fourth and fifth embodiments can be combined.

As described above, according to the image processing device, method, and program of each embodiment, it is possible to accurately detect discontinuity of image brightness in a screen.

Moreover, according to the image processing device, method, and program of each embodiment, it is possible to detect discontinuity of image brightness in a screen without increasing a memory resource.

Furthermore, according to the image processing device, method, and program of each embodiment, it is possible to reduce the delay produced by the correction process of correcting the discontinuous image brightness.

The present invention is not limited to the above-described embodiments and can be variously changed without departing from the scope of the invention. Each embodiment is described with a video camera as an example. However, the image processing device, method, and program of the present invention are applicable to arbitrary electronic devices which handle image data. For example, the image processing device of each embodiment may be mounted on an image display device, an information processing apparatus such as a computer to correct image data including a screen partially having high luminance inside the image display device or information processing device.

In the configuration of each embodiment, video data which is already processed by the image signal processing unit 3 is corrected. However, in the present invention, video data which is not yet processed by the image signal processing unit may be corrected. Moreover, in the configuration of each embodiment, the buffer memory 4 is used which is separately provided from the image signal processing unit 3 and the compression/decompression processing unit 5. However, the buffer memory 4 may be a buffer memory used in the image signal processing unit 3 or compression/decompression processing unit 5, and the circuit (block) configuration can be properly changed.

The image processing program of the present invention may be recorded in a computer-readable recording medium to be provided or may be delivered through a communication line such as the Internet. The image processing program recorded in the recording medium or the image processing program delivered through a communication may be stored in the image processing device and caused to execute the aforementioned image processing method.

What is claimed is:

1. An image processing device comprising:
   a flash detection unit configured to calculate a line average luminance of each line of a current frame of image data and a frame average luminance of a past frame at least one frame before the current frame and to compare the calculated line average luminance of each line with the calculated frame average luminance to detect whether some lines of the current frame have high luminance due to a flash;
   a holding unit configured to hold the past frame of the image data; and
   a flash correction unit configured to replace the lines having high luminance in the current frame with corresponding lines of the past frame, which are held in the holding unit, to correct the image data, if the flash detection unit detects that some lines of the current frame have high luminance, wherein
   the flash detection unit includes:
   a block average luminance calculation section configured to calculate a block average luminance of each block of the blocks which are obtained by dividing each line of the current frame;
   a line average luminance calculation section configured to calculate the line average luminance of each line of the current frame based on the block average luminances of each line calculated by the block average luminance calculation section;
   a frame average luminance calculation section configured to calculate the frame average luminance of the past frame based on the line average luminance of each line of the past frame calculated by the line average luminance calculation section;
   a difference calculation section configured to calculate a difference value between each block average luminance and the frame average luminance and a difference value between each line average luminance and the frame average luminance; and
   a flash determination section configured to determine a presence of high luminance due to a flash if at least a predetermined number of consecutive lines are in a particular state, the particular state being a state in which the difference between the line average luminance and the frame average luminance is equal to or larger than a first threshold value and the difference between each block average luminance and the frame average luminance is equal to or larger than a second threshold value.

2. The image processing device according to claim 1, wherein the flash determination section determines that a current line is in the particular state if the difference value between each block average luminance of a line above the current line calculated by the block average luminance calculation section and the frame average luminance calculated by the frame average luminance calculation section is less than a third threshold value which is equal to or different from the second threshold value.

3. The image processing device according to claim 2, wherein the line above the current line is any number of lines between one and three before the current line.

4. The image processing device according to claim 1, wherein the flash determination section determines that a current line is in the particular state if the difference value between the block average luminance of each block of the current line and the block average luminance of the corresponding block of a line above the current line is equal to or larger than a third threshold value, the block average luminances being calculated by the block average luminance calculation section.

5. The image processing device according to claim 4, wherein the line above the current line is any number of lines between one and three before the current line.

6. The image processing device according to claim 1, wherein the flash determination section determines that a current line is not in the particular state if the difference between the line average luminance of the current line and the frame average luminance is less than a fourth threshold value which is smaller than the first threshold value.

7. An image processing device comprising:
   a flash detection unit configured to calculate a line average luminance of each line of a current frame of image data and a frame average luminance of a past frame at least one frame before the current frame and to compare the calculated line average luminance of each line with the calculated frame average luminance to detect whether some lines of the current frame have high luminance due to a flash;
   a holding unit configured to hold the past frame of the image data and
   a flash correction unit configured to replace the lines having high luminance in the current frame with corresponding lines of the past frame, which are held in the holding unit, to correct the image data, if the flash detection unit detects that some lines of the current frame have high luminance, wherein
   the flash detection unit detects a flash start line as a first line that has high luminance due to a flash and a flash end line as a last line, and
   the flash correction unit sets a first adjacent area which is located above the flash start line and is adjacent thereto and a second adjacent area which is located below the flash end line and is adjacent thereto,
   in the first adjacent area, mixes image data of the current frame and image data of the past frame in such a manner that a proportion of image data of the current frame gradually decreases from the first line to the last line of the first adjacent area and a proportion of image data of the past frame gradually increases from the first line to the last line, and
   in the second adjacent area, mixes image data of the current frame and image data of the past frame in such a manner that the proportion of image data of the current frame gradually increases from the first line to the last line of the second adjacent area and the proportion of image data of the past frame gradually decreases from the first line to the last line.

8. An image processing device comprising:
   a flash detection unit configured to calculate a line average luminance of each line of a current frame of image data and a frame average luminance of a past frame at least one frame before the current frame and to compare the calculated line average luminance of each line with the calculated frame average luminance to detect whether some lines of the current frame have high luminance due to a flash;

a holding unit configured to hold the past frame of the image data; and a flash correction unit configured to replace the lines having high luminance in the current frame with corresponding lines of the past frame, which are held in the holding unit, to correct the image data, if the flash detection unit detects that some lines of the current frame have high luminance, wherein the flash detection unit detects a flash start line as a first line that has high luminance due to a flash and a flash end line as a last line, and the flash correction unit sets a first adjacent area which is located above the flash start line and adjacent thereto and a second adjacent area which is located below the flash end line and adjacent thereto, in the first and second adjacent areas, the flash correction unit corrects the image data by using only pixel data of the current frame if a brightness of each pixel in the first and second adjacent areas is less than a first threshold value, using only pixel data of the past frame if the brightness of each pixel in the first and second adjacent areas is more than a second threshold value, which is larger than the first threshold value, and mixing the pixel data of the current frame and the pixel data of the past frame if the brightness of each pixel in the first and second adjacent areas is equal to or larger than the first threshold value and equal to or less than the second threshold value.

9. An image processing method comprising:

calculating a line average luminance of each line of a current frame of image data;

calculating a frame average luminance of a past frame of the image data, the past frame being at least one frame before the current frame;

comparing the line average luminance of each line and the frame average luminance to detect whether some lines of the current frame have high luminance due to a flash, by holding the past frame of the image data in a holding unit; and if it is detected that some lines of the current frame have high luminance, replacing the lines of high luminance in the current frame with lines of the past frame held by the holding unit, to correct the image data, the method further comprising:

calculating a block average luminance of each block of the blocks which are obtained by dividing each line of the current frame;

calculating the line average luminance of each line of the current frame based on the block average luminances of each line;

calculating the frame average luminance of the past frame based on the line average luminance of each line of the past frame;

calculating a difference value between each block average luminance and the frame average luminance and a difference value between each line average luminance and the frame average luminance and;

determining that some lines of the current frame have high luminance due to a flash if at least a predetermined number of consecutive lines are in a particular state, the particular state being a state in which the difference between the line average luminance of a line and the frame average luminance is equal to or larger than a first threshold value and the difference between the block average luminance of each block of the line and the frame average luminance is less than a second threshold value.

10. The image processing method according to claim 9, the method further comprising:

determining that a current line is in the particular state if the difference value between each block average luminance calculated for a line above the current line and the calculated frame average luminance is less than a third threshold value which is equal to or different from the second threshold value.

11. The image processing method according to claim 9, the method further comprising:

determining that a current line is in the particular state if the difference value between the block average luminance of each block calculated for the current line and the corresponding block average luminance calculated for a line above the current line is equal to or larger than a third threshold value.

12. An image processing method comprising:

calculating a line average luminance of each line of a current frame of image data;

calculating a frame average luminance of a past frame of the image data, the past frame being at least one frame before the current frame;

comparing the line average luminance of each line and the frame average luminance to detect whether some lines of the current frame have high luminance due to a flash, by holding the past frame of the image data in a holding unit; and if it is detected that some lines of the current frame have high luminance, replacing the lines of high luminance in the current frame with lines of the past frame held by the holding unit, to correct the image data, the method further comprising:

detecting a flash start line as a first line that has high luminance due to a flash and a flash end line as a last line;

setting a first adjacent area which is located above the flash start line and is adjacent thereto and a second adjacent area which is located below the flash end line and is adjacent thereto;

correcting the image data in the first adjacent area by mixing image data of the current frame and image data of the past frame in such a manner that a proportion of the image data of the current frame gradually decreases from the first line to the last line of the first adjacent area while a proportion of the image data of the past frame gradually increases; and correcting the image data in the second adjacent area by mixing the image data of the current frame and image data of the past frame in such a manner that the proportion of the image data of the current frame gradually increases from the first line to the last line of the first adjacent area as the proportion of the image data of the past frame decreases.

13. An image processing method comprising:

calculating a line average luminance of each line of a current frame of image data;

calculating a frame average luminance of a past frame of the image data, the past frame being at least one frame before the current frame;

comparing the line average luminance of each line and the frame average luminance to detect whether some lines of the current frame have high luminance due to a flash, by holding the past frame of the image data in a holding unit; and if it is detected that some lines of the current frame have high luminance, replacing the lines of high luminance in the current frame with lines of the past frame held by the holding unit, to correct the image data, the method further comprising:

detecting a flash start line as a first line that has high luminance due to a flash and a flash end line as a last line;

setting a first adjacent area which is located above the flash start line and is adjacent thereto and a second adjacent area which is located below the flash end line and is adjacent thereto; and correcting the image data in the first and second adjacent areas by using only pixel data of the current frame if a brightness of each pixel in the first and second adjacent areas is less than a first threshold value, using only pixel data of the past frame if the brightness of each pixel in the first and second adjacent areas is more than a second threshold value, which is larger than the first threshold value, and mixing the pixel data of the current frame and the pixel data of the past frame if the brightness of each pixel in the first and second adjacent areas is equal to or larger than the first threshold value and equal to or less than the second threshold value.

14. A non-transitory computer readable medium storing an image processing program for causing a computer to implement the following functions, comprising:

a function of calculating a line average luminance of each line of a current frame of image data;

a function of calculating a frame average luminance of a past frame of the image data, the past frame being at least one frame before the current frame;

a function of comparing the line average luminance of each line and the frame average luminance to detect whether some lines of the current frame have high luminance due to a flash, by a function of holding the past frame of the image data in a holding unit; and a function of replacing the lines of high luminance in the current frame with lines of the past frame held by the holding unit, to correct the image data, if it is detected that some lines of the current frame have high luminance, the image processing program further implementing the following functions of:

calculating a block average luminance of each block of the blocks which are obtained by dividing each line of the current frame;

calculating the line average luminance of each line of the current frame based on the block average luminances of each line;

calculating the frame average luminance of the past frame based on the line average luminance of each line of the past frame;

calculating a difference between each block average luminance and the frame average luminance, and a difference between each line average luminance and the frame average luminance, and determining that some lines of the current have high luminance due to a flash if at least a predetermined number of consecutive lines are in a particular state, the particular state being a state in which the difference between the line average luminance of a line and the frame average luminance is equal to or larger than a first threshold value and the difference between the block average luminance of each block of the line and the frame average luminance is less than a second threshold value.

15. The non-transitory computer readable medium storing the image processing program according to claim 14, the program causing the computer to further implement the following functions of:

determining that a current line is in the particular state if the difference value between the block average luminance of each block calculated for the current line and the corresponding block average luminance calculated for a line above the current line is equal to or larger than a third threshold value.

16. The non-transitory computer readable medium storing the image processing program according to claim 14, the program causing the computer to further implement the following functions of:

determining that a current line is in the particular state if the difference value between each block average luminance calculated for a line above the current line and the calculated frame average luminance is less than a third threshold value which is equal to or different from the second threshold value.

17. A non-transitory computer readable medium storing an image processing program for causing a computer to implement the following functions, comprising:

a function of calculating a line average luminance of each line of a current frame of image data;

a function of calculating a frame average luminance of a past frame of the image data, the past frame being at least one frame before the current frame;

a function of comparing the line average luminance of each line and the frame average luminance to detect whether some lines of the frame have high luminance due to a flash, by a function of holding the past frame of the image data in a holding unit; and a function of replacing the lines of high luminance in the current frame with lines of the past frame held by the holding unit, to correct the image data, if it is detected that some lines of the current frame have high luminance, the image processing program further implementing the following functions of:

detecting a flash start line as a first line that has high luminance due to a flash and a flash end line as a last line;

setting a first adjacent area which is located above the flash start line and is adjacent thereto and a second adjacent area which is located below the flash end line and is adjacent thereto;

mixing, in the first adjacent area, image data of the current frame and image data of the past frame in such a manner that a proportion of the image data of the current frame gradually decreases from the first line to the last line of the first adjacent area as a proportion of the image data of the past frame gradually increases; and mixing, in the second adjacent area, the image data of the current frame and the image data of the past frame in such a manner that the proportion of the image data of the current frame gradually increases from the first line to the last line of the first adjacent area as the proportion of the image data of the past frame decreases.

18. A non-transitory computer readable medium storing an image processing program for causing a computer to implement the following functions, comprising:

a function of calculating a line average luminance of each line of a current frame of image data;

a function of calculating a frame average luminance of a past frame of the image data, the past frame being at least one frame before the current frame;

a function of comparing the line average luminance of each line and the frame average luminance to detect whether some lines of the frame have high luminance due to a flash, by a function of holding the past frame of the image data in a holding unit; and a function of replacing the lines of high luminance in the current frame with lines of the past frame held by the holding unit, to correct the image data, if it is detected that some lines of the current frame have high luminance, the image processing program further implementing the following functions of:

detecting a flash start line as a first line that has high luminance due to a flash and a flash end line as a last line;

setting a first adjacent area which is located above the flash start line and is adjacent thereto and a second adjacent area which is located below the flash end line and is adjacent thereto;

correcting the image data in the first and second adjacent areas by using only pixel data of the current frame if a brightness of each pixel in the first and second adjacent areas is less than a first threshold value, using only pixel data of the past frame if the brightness of each pixel in the first and second adjacent areas is more than a second threshold value, which is larger than the first threshold value, and mixing the pixel data of the current frame and the pixel data of the past frame if the brightness of each pixel in the first and second adjacent areas is equal to or larger than the first threshold value and equal to or less than the second threshold value.

* * * * *